United States Patent
Seddigh et al.

(10) Patent No.: US 6,973,035 B2
(45) Date of Patent: Dec. 6, 2005

(54) METHOD AND SYSTEM FOR A ROUTING MECHANISM TO SUPPORT TWO-WAY RSVP RESERVATIONS

(75) Inventors: Nabil N. Seddigh, North Gower (CA); Biswajit B. Nandy, Kanata (CA)

(73) Assignee: Nortel Networks Limited, (CA)

( * ) Notice: Subject to any disclaimer, the term of this patent is extended or adjusted under 35 U.S.C. 154(b) by 801 days.

(21) Appl. No.: 09/750,174

(22) Filed: Dec. 29, 2000

(65) Prior Publication Data

US 2002/0085494 A1    Jul. 4, 2002

(51) Int. Cl.[7] ............................................. G01R 31/08
(52) U.S. Cl. ..................................... 370/235; 370/352
(58) Field of Search ............................... 370/389–395, 370/235, 231, 397, 230; 379/229; 709/208

(56) References Cited

U.S. PATENT DOCUMENTS

| | | | |
|---|---|---|---|
| 6,195,355 B1 * | 2/2001 | Demizu | 370/397 |
| 6,324,279 B1 * | 11/2001 | Kalmanek et al. | 379/229 |
| 6,366,577 B1 * | 4/2002 | Donovan | 370/352 |
| 6,496,479 B1 * | 12/2002 | Shionozaki | 370/230 |
| 6,556,577 B2 * | 4/2003 | Hjalmtysson et al. | 370/410 |
| 6,578,076 B1 * | 6/2003 | Putzolu | 709/223 |
| 6,601,082 B1 * | 7/2003 | Durham et al. | 718/100 |
| 6,621,793 B2 * | 9/2003 | Widegren et al. | 370/230.1 |
| 6,680,943 B1 * | 1/2004 | Gibson et al. | 370/392 |
| 6,714,987 B1 * | 3/2004 | Amin et al. | 709/249 |

* cited by examiner

Primary Examiner—Chi Pham
Assistant Examiner—Prenell Jones
(74) Attorney, Agent, or Firm—Steubing McGuiness & Manaras LLP

(57) ABSTRACT

Different arrangements are provided for two-way RSVP reservations. The network resources needed for a two-way communication involving a first party and a second party are reserved via either a 3-way RSVP handshake or a 4-way handshake.

29 Claims, 18 Drawing Sheets

METHOD AND SYSTEM FOR A ROUTING MECHANISM TO SUPPORT TWO-WAY RSVP RESERVATIONS

BACKGROUND OF THE INVENTION

1. Field of the Invention

Aspects of the invention generally relate to the field of network communications. Specifically, aspects of the present invention relate to a method and system for a quality of service mechanism that supports two-way RSVP reservations.

2. Description of Background Information

In an information age, achieving the highest network service quality is as important as developing best class of networking products. This is particularly so when new applications, such as Voice over IP (VoIP) and video conferencing, place new demands on the network. Various service models, network protocols, and standards have been proposed, aiming at improving the network management efficiency and maximizing the utilization of the network.

Quality of Service (QoS) mechanisms are proposed to provide the necessary level of service to applications and to maintain an expected quality level. The first concerted effort at providing QoS for IP networks focused on the Integrated Services (IntServ) architecture, which provides per-flow end-to-end QoS guarantees based on signaled requests from end-host applications. RSVP emerged as the signaling protocol of choice for IntServ.

The Differentiated Services (DiffServ or DS) architecture has recently become the preferred method that addresses QoS issues in IP networks. In DiffServ, individual flows are grouped into aggregated traffic classes by edge devices such as edge routers. Packets are marked to reflect the treatment required by the traffic class. Core routers differentially treat packets according to the traffic class marking. Recently, RSVP has been used as the protocol of choice to enable dynamic signaling and admission control in DiffServ IP networks.

FIG. 1 shows a DS framework. A DS framework comprises a plurality of DS domains, each of which is a set of contiguous DS-compliant networks containing DS-compliant nodes. An end-to-end differentiated service is obtained by the concatenation of per-domain services and service level agreements between adjoining domains along a source-to-destination traffic path. The exemplary DS shown in FIG. 1 is a concatenation of 4 DS domains, each of which has ingress devices ($E_1$, $E_3$, $E_5$, $E_7$), egress devices ($E_2$, $E_4$, $E_6$, $E_8$), or collectively referred to herein as edge devices, and core devices ($C_1$, $C_2$, $C_3$, $C_4$).

Per-domain services are realized by traffic conditioning at the edge and simple differentiated forwarding mechanisms at the core of the network. To build an end-to-end service, subscribed traffic profiles for customers are maintained by using traffic filters. The traffic is metered and measured against the associated traffic profiles. Packets are grouped into a set of coarse aggregate flows that receive differentiated treatment at the network core.

In both IntServ and DiffServ architectures, RSVP is used for one-directional resource reservation. For an application that requires 2-way traffic on the network such as a Voice-over-IP application, two separate reservations need to be made. FIG. 2 depicts a typical receiver-driven RSVP signaling scheme in a DS framework. In FIG. 2, a 3-way handshake RSVP is used to complete a one-directional reservation. The first handshake is from a sender 310 to a receiver 320 with a PATH message to probe a path. The second is from the receiver 320 to the sender 310 with a RESV message that initiates the reservation at edge devices along the path. The third is from the sender 310 back to the receiver 320 with an acknowledgement message. An RSVP request is processed only at edge devices and the reservation is made via the communication with the Policy and Decision Point (PDP) at each domain. With this scheme, a two-directional reservation requires two rounds of 3-way handshake, resulting in a total of six-way handshake.

SUMMARY OF THE INVENTION

A method and system, consistent with the principles of the present invention, provides support for two-way RSVP reservations. A first embodiment of the present invention is a sender driven protocol that completes a bi-directional RSVP reservation for a two-way communication application in a 3-way handshake. A second embodiment of the present invention is a receiver driven protocol that completes a bi-directional RSVP reservation in a 4-way handshake.

BRIEF DESCRIPTION OF THE DRAWINGS

The present invention is further described in the detailed description which follows, with reference to the drawings by way of non-limiting embodiments of the present invention. It is noted that, throughout the description, like reference numerals represent similar parts of the present invention throughout the several views and wherein.

DETAILED DESCRIPTION OF SEVERAL EMBODIMENTS

Figure 1:
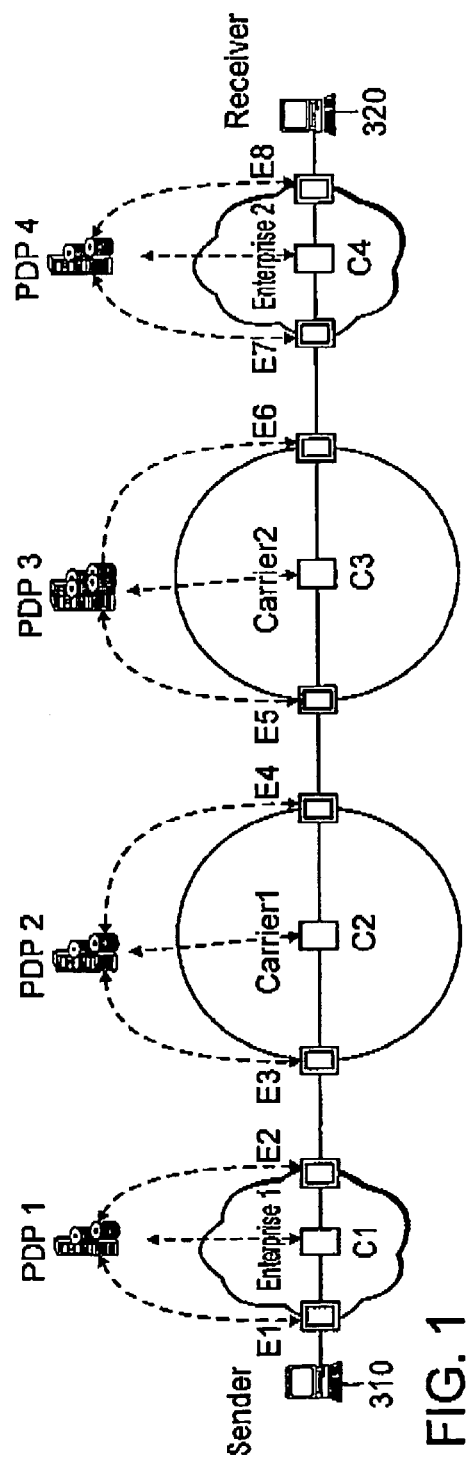
FIG. 1 illustrates an exemplary differentiated services network, connecting a sender and a receiver via four Differentiated Service domains.
Figure 2:
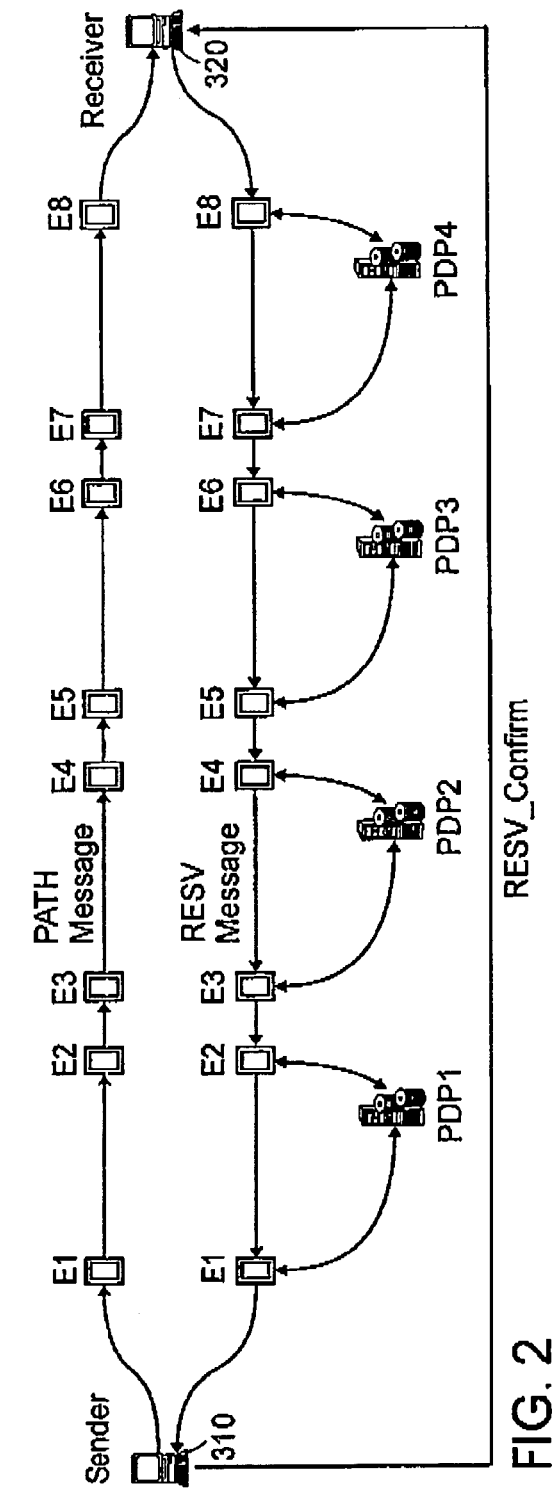
FIG. 2 shows a known example of a receiver-driven RSVP reservation scheme in a DS network.
Figure 3:
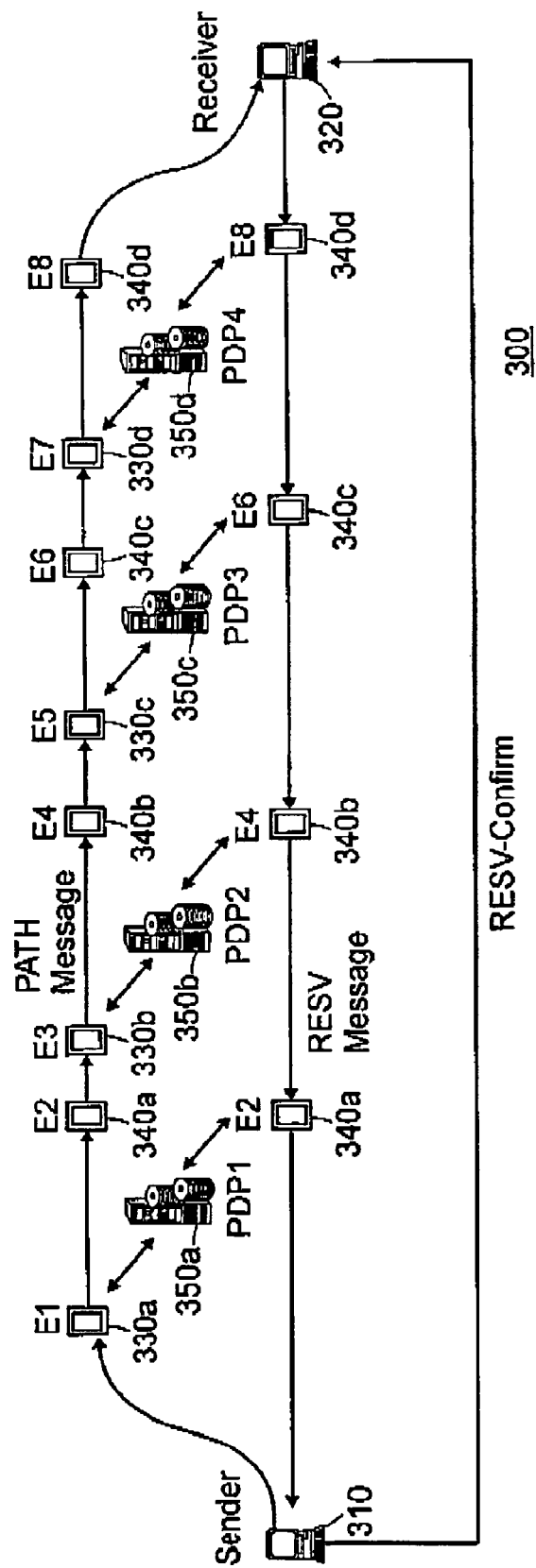
FIG. 3 illustrates an embodiment of the invention, in which a sender-driven RSVP scheme completes a two-directional reservation in a three-way handshake protocol.

FIG. 3 illustrates a first embodiment of the invention, in which an RSVP scheme for reserving network resource for a two-way communication application is shown. The scheme illustrated in FIG. 3 is sender-driven and it completes a two directional resource reservation in a 3-way handshake. In FIG. 3, there are two participants in a two-way communication. The party that initiates the handshake is identified herein as the sender (310). The other party is identified herein as the receiver (320). Even though either party may send information to the other once a two-way communication is established, the terms sender and the receiver will be used throughout this description according to the definition above. Forward direction is herein defined as from the sender 310 to the receiver 320 and reverse direction is herein defined as from the receiver 320 to the sender 310.

There are four concatenated network domains in the exemplary network in FIG. 3. Looking in the forward direction, $E_1$ and $E_2$ (330a and 340a) are the ingress and egress policy enforcement devices of the first domain, or collectively are referred to herein as edge policy enforcement device. A policy enforcement device is used herein as a general term. A policy enforcement device may be implemented as a router or as a multiplexer. Similarly, $E_3$ and $E_4$ (330b, 340b) are the ingress and egress policy enforcement devices of the second domain, $E_5$ and $E_6$ (330c and 340c) are the ingress and egress policy enforcement devices of the third domain, and $E_7$ and $E_8$ (330d and 340d) are the ingress and egress policy enforcement devices of the fourth domain, respectively.

Even though ingress and egress policy enforcement devices are reversed when the traffic flow is in the reverse direction, for the clarity of this presentation, ingress and egress policy enforcement devices are herein termed with respect to the forward direction. Each domain in FIG. 3 has its own Policy Decision Point (PDP) (350a, 350b, 350c, or 350d). To perform resource reservation, an edge policy enforcement device, either ingress or egress, may communicate with its domain PDP using Common Open Policy Services—RSVP (COPS-RSVP) protocol.

In the 3-way handshake RSVP scheme described in FIG. 3, the first pass reserves the network resources in forward direction. In the second pass, network resources in reverse direction are reserved. The third pass simply delivers an acknowledgement message that completes the 3-way handshake.

In FIG. 3, sender 310 initiates a 3-way handshake by generating a PATH message. The PATH message contains information identifying the sending session as well as the traffic profile for the sender 310. At the ingress of each domain, the edge policy enforcement device (330a, 30b, 330c, or 330d) intercepts the PATH message and performs policy and bandwidth admission control by communicating with the corresponding PDP (350a, 350b, 350c, or 350d) using COPS-RSVP. If the admission control decision is granted, the PATH message is passed on to the egress policy enforcement device (340a, 340b, 340c, or 340d) of the same domain. The ingress policy enforcement devices do not add their address to the NEXT_HOP object in the PATH message because the RESV message in the second pass will not go through ingress policy enforcement devices. At the egress of each domain, the edge policy enforcement device (340a, 340b, 340c, or 340d) examines the PATH message and adds its own address to the NEXT_HOP object to ensure that the RESV message in the second pass will be sent to it.

When the PATH message reaches the receiver 320, the reservation in one direction (forward direction) is successful. In this case, receiver 320 generates an RESV message. Such generated RESV message does not simply echo the PATH message, as would be the case in a conventional method. Instead, it carries the network reservation information from the receiver 320 to the sender 310 (in the reverse direction). This RESV message is sent hop-by-hop from the receiver 320 to the sender 310 via the egress policy enforcement device (340a, 340b, 340c, 340d) of each domain, following the addresses specified in the NEXT_HOP object. At each egress policy enforcement device, communication with the PDP of the same domain decides whether the resource reservation request in the reverse direction will be admitted or not. If the request is admitted, the PDP will install necessary filters and traffic profiles via COPS-PRovisioning (COPS-PR). When RESV message reaches the sender 310, the reservation in the second direction (reverse direction) is successful. The sender 310 then sends a RESV_Confirm message directly to the receiver 320 to complete the 3-way handshake.

In the embodiment illustrated in FIG. 3, a two-way reservation is considered successful when the admission control decisions are granted in both directions. A failure in reserving the resource in the forward direction at any ingress policy enforcement device (330a, 330b, 330c . . . ) may be signaled by sending a PATH_ERR message from that policy enforcement device to the sender 310. A failure in reserving the resource in the reverse direction at any egress policy enforcement device (340d, 340c, 340b . . . ) may be signaled by sending an RESV_ERR message back to the receiver 320. To inform the sender 310 of a failure in reserving the resources in reverse direction, either a PATH_ERR message may be sent to the sender 310 or a time out mechanism may be applied at the sender 310.

Figure 4:
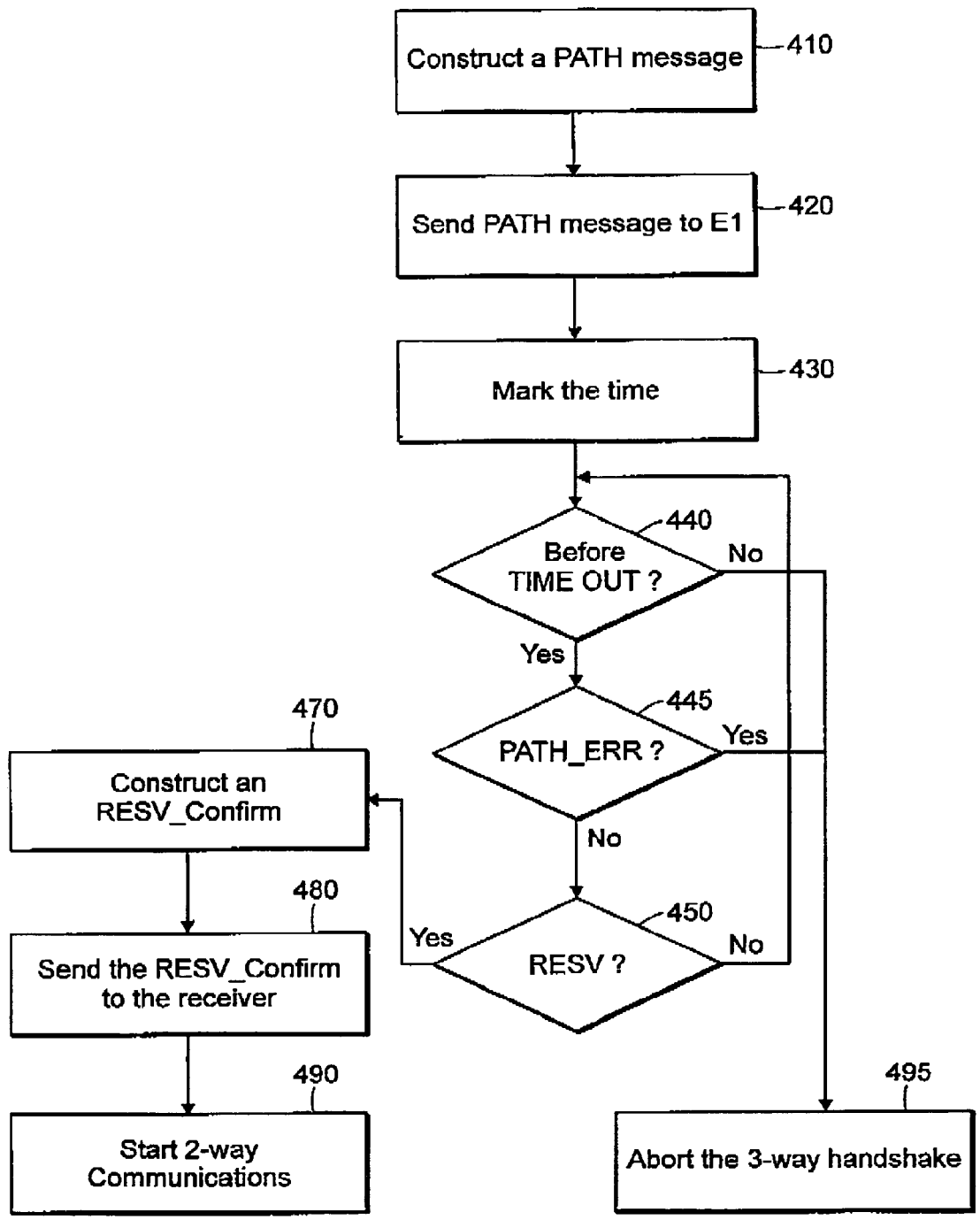
FIG. 4 is a flowchart for the first party, in a two-way communication application, who initiates the two-way communication.
Figure 4A:
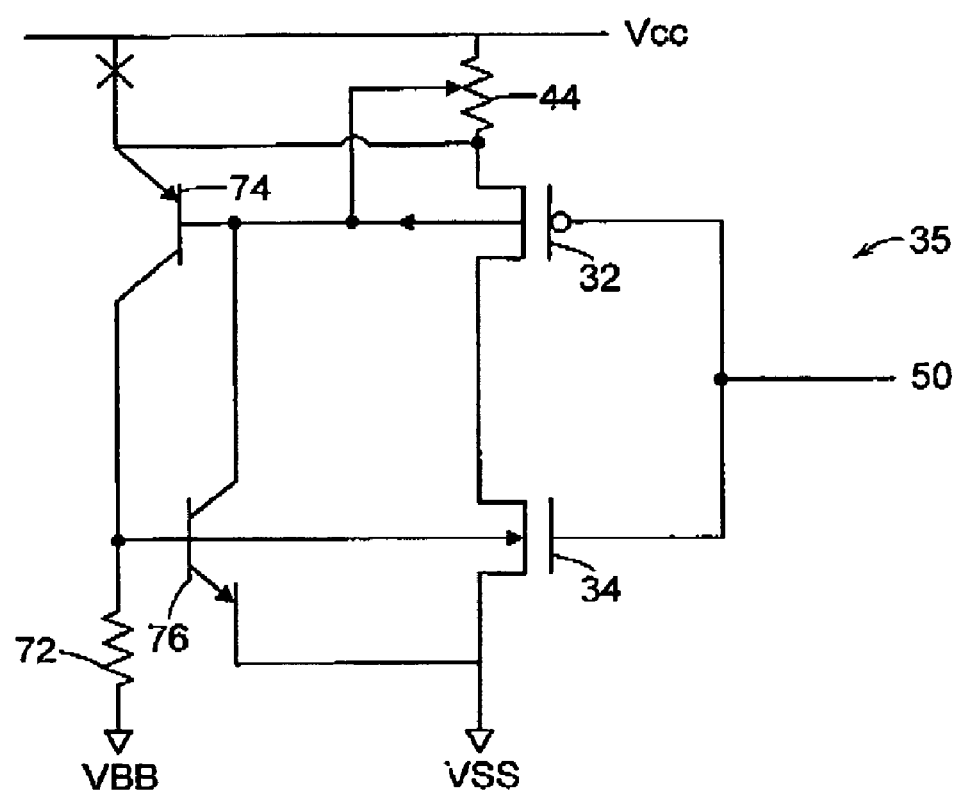
Figure 4B:
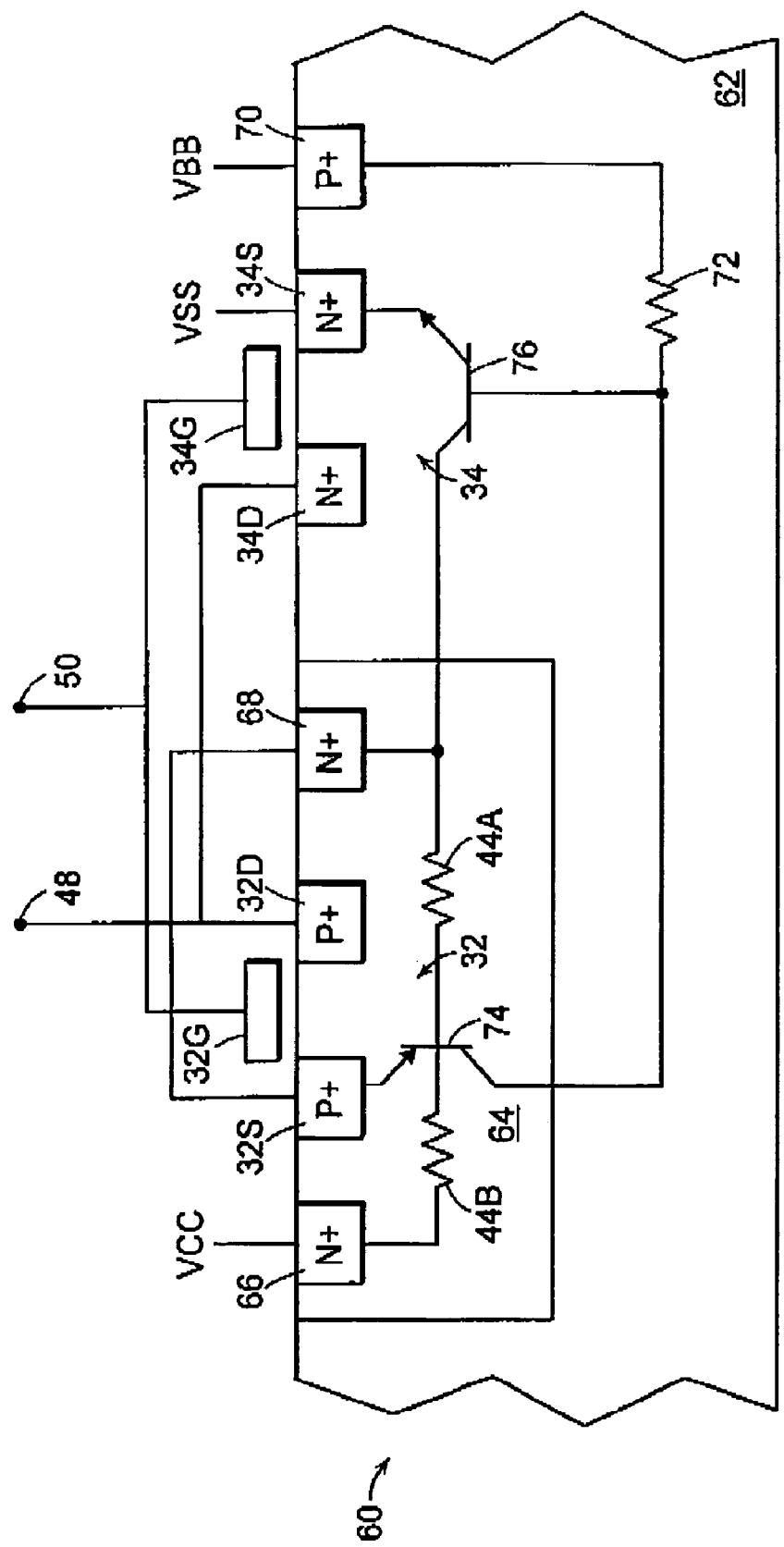

FIG. 4 shows a flowchart for the sender 310. To initiate a two-directional RSVP reservation, sender 310 first constructs a PATH message at 410. This PATH message carries information identifying the sending session as well as the traffic profile for the sender 310, and initiates the resource reservation for forward direction. The PATH message is sent out at 420. Time may be marked at 430 so that a time reference for a time-out mechanism may be established. The sender 310 then enters a waiting mode for a return message.

If a message is not received before a time-out at 440, the handshake is aborted. If a message is received within the time-out at 440, the type of the message is determined. It is first examined at 445 to see whether it is a PATH_ERR message. A PATH_ERR message indicates that the reservation for the forward direction has failed. In this case, the sender 310 aborts the 3-way handshake. If the return message is not a PATH_ERR message, it may be further examined at 450 to see whether it is an RESV message. If it is not an RESV message, the sender 310 goes back to 440 to wait for a return message. When the received message is an RESV, it means that the reservation in both forward and reverse directions have been successful. In this case, the sender 310 constructs a third message, an RESV_Confirm message, at 470 and sends it out at 480 directly to the receiver 320 to complete the 3-way handshake. At this point, a two-way communication application may be started at 490.

Figure 5:
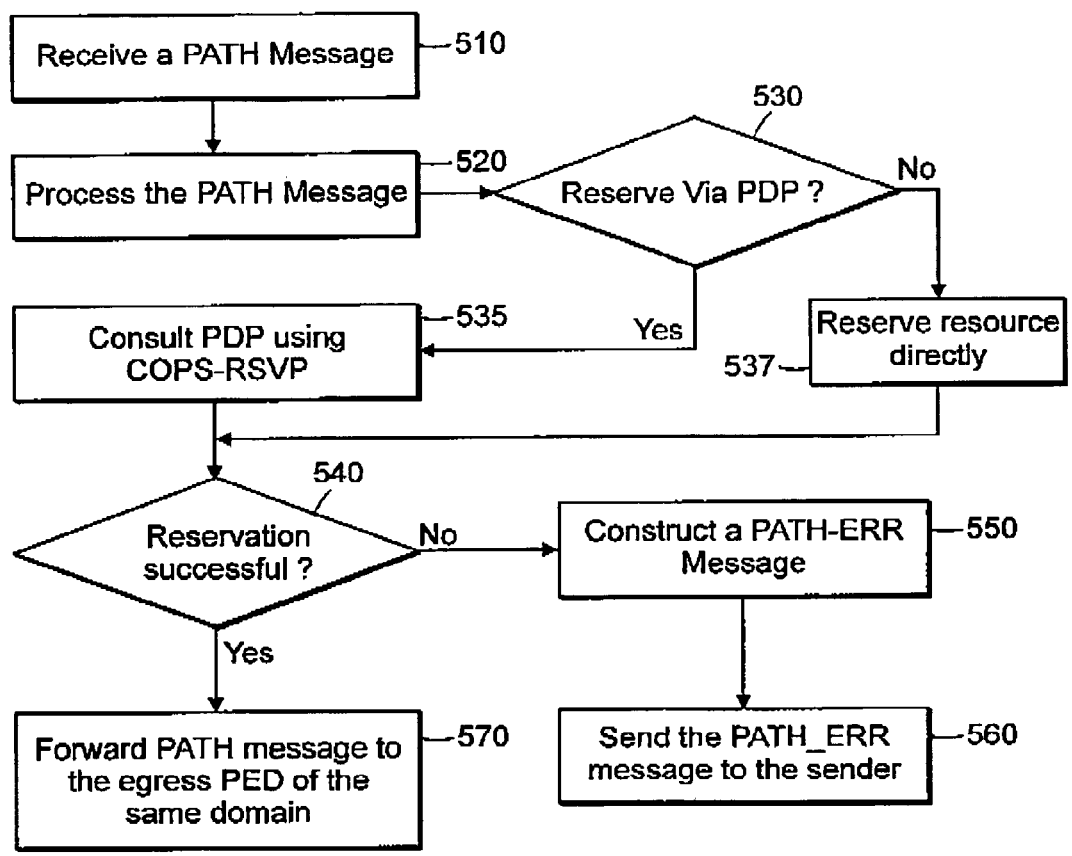
FIG. 5 is a flowchart for an ingress policy enforcement device of a DS domain.

Once a PATH message is sent out from the sender 310, the message travels through the network, from edge policy enforcement device to edge policy enforcement device, before it reaches the receiver 320. FIG. 5 shows the flowchart of another embodiment of the invention for an ingress policy enforcement device. In FIG. 5, upon intercepting a PATH message at an ingress policy enforcement device at 510, the received PATH message is processed at 520. Using the information carried in the received PATH message, the ingress policy enforcement device reserves the network resource.

The reservation may be made by communicating with the PDP in the same domain as a policy enforcement device using COPS-RSVP. By examining the reservation request from the policy enforcement device against the available resources and the network policies, the PDP decides whether the request will be granted or not. The decision is then communicated back to the policy enforcement device. A different embodiment for reserving network resource is directly through the policy enforcement device without consulting with the PDP. In this case, the admission required domain wide information is available to the policy enforcement device and the policy enforcement device is entrusted by the network administrators to make resource reservation decisions based on local knowledge.

In FIG. 5, whether the reservation is made through the PDP is determined at act 530. If the reservation needs to be made through the PDP, the policy enforcement device communicates with the PDP at act 535 using COPS-RSVP. If the policy enforcement device can reserve resource directly, the resource is reserved at act 537 directly by the policy enforcement device. The reservation may succeed or fail, depending on, for example, the availability of the network resources, the admission policies, as well as the resources that are needed.

If the reservation is not successful, determined at act 540, the ingress policy enforcement device may construct a PATH_ERR message at 550 and sends it back at act 560 to the sender 310 to inform an unsuccessful reservation for the forward direction. If the reservation is successful, the ingress policy enforcement device forwards the PATH message to an egress policy enforcement device of the same domain at 570.

Figure 6:
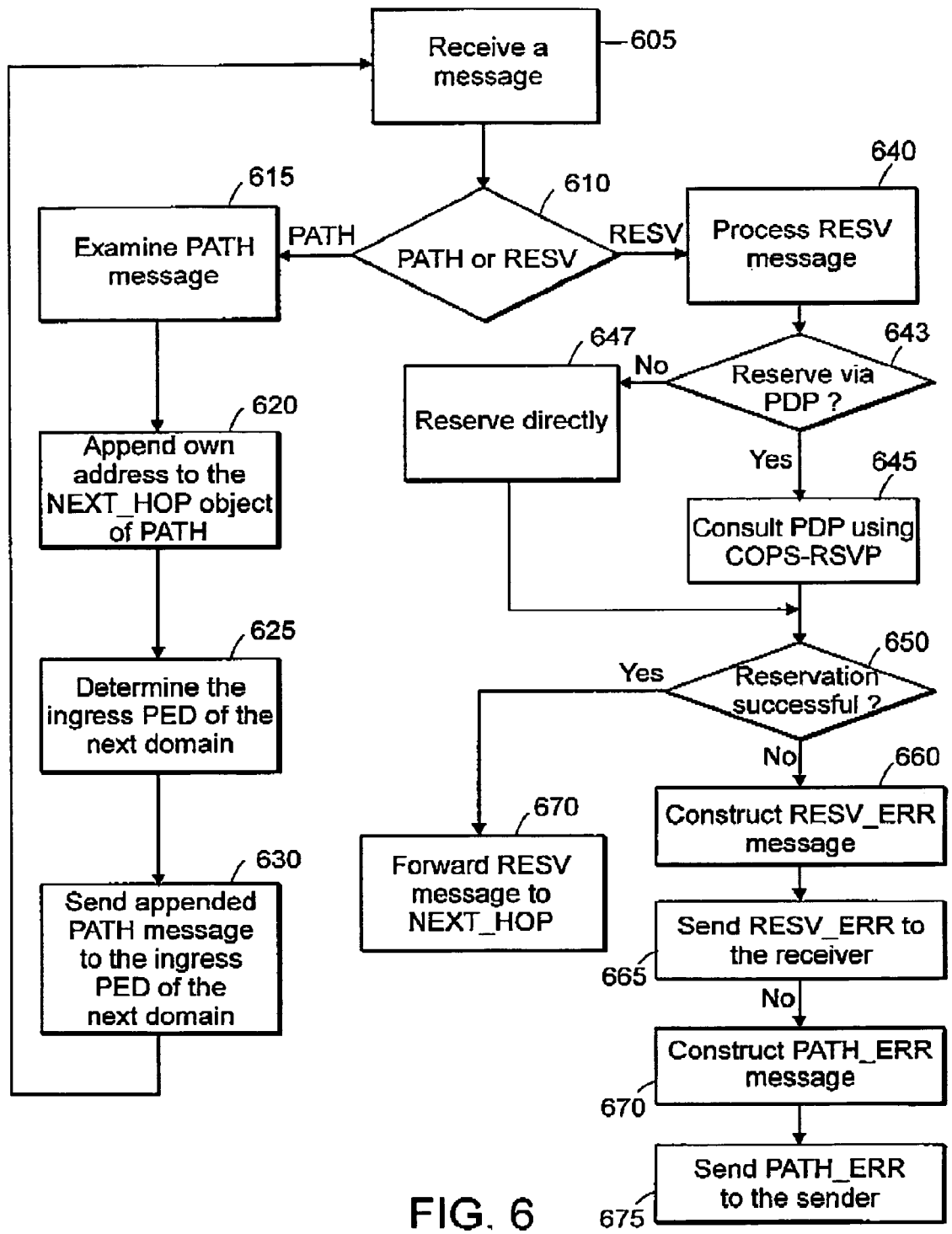
FIG. 6 is a flowchart for an egress policy enforcement device of a DS domain.

As indicated in FIG. 3, an egress policy enforcement device receives and processes messages in both first and second passes. A PATH message is intercepted by an egress policy enforcement device in the first pass and an RESV message is passed to an egress policy enforcement device in the second pass. FIG. 6 is a flowchart for an egress policy enforcement device. When a message is received at an egress policy enforcement device at 605, it is examined to see whether it is a PATH message or an RESV message. If the received message is a PATH message, the egress policy enforcement device processes the PATH message at 615 and adds its own address to the NEXT_HOP object of the PATH message at 620, making sure that the RESV message in the second pass will be sent to this policy enforcement device. The egress policy enforcement device determines an ingress policy enforcement device of the next domain at 635 and forwards the PATH message to the ingress policy enforcement device at 630. The egress policy enforcement device then returns to 605 to wait for the arrival of next message.

When the message received by an egress policy enforcement device is an RESV message (decided at 610), it indicates that the reservation for the forward direction has been successful. This RESV message, carrying the reservation information for the reverse direction, initiates the resource reservation for the reverse traffic. The egress policy enforcement device processes the RESV message at 640.

Based on the reservation information carried in the RESV message, the egress policy enforcement device determines, at act 643, whether the needed network resource needs to be reserved through the PDP. If the reservation is to be made through the PDP, the policy enforcement device consults with its PDP at 645 and receives a decision from the PDP. If the policy enforcement device can make reservation directly, the resource is reserved at act 647.

If the reservation is successful, determined at act 650, the egress policy enforcement device forwards the RESV message to the next egress policy enforcement device at 670. If the reservation is not successful (the required resources are not granted), the egress policy enforcement device constructs error messages and sends to both the sender 310 and the receiver 320. At act 660, an RESV_ERR message is constructed and sent, at 665 to the receiver 320, signaling that the reservation request initiated by the receiver 320 has failed. The egress policy enforcement device may also construct a PATH_ERR message, at act 670, and send it, at act 675, to the sender 310 to indicate a failure in reserving the network resource in the reverse direction.

Figure 7:
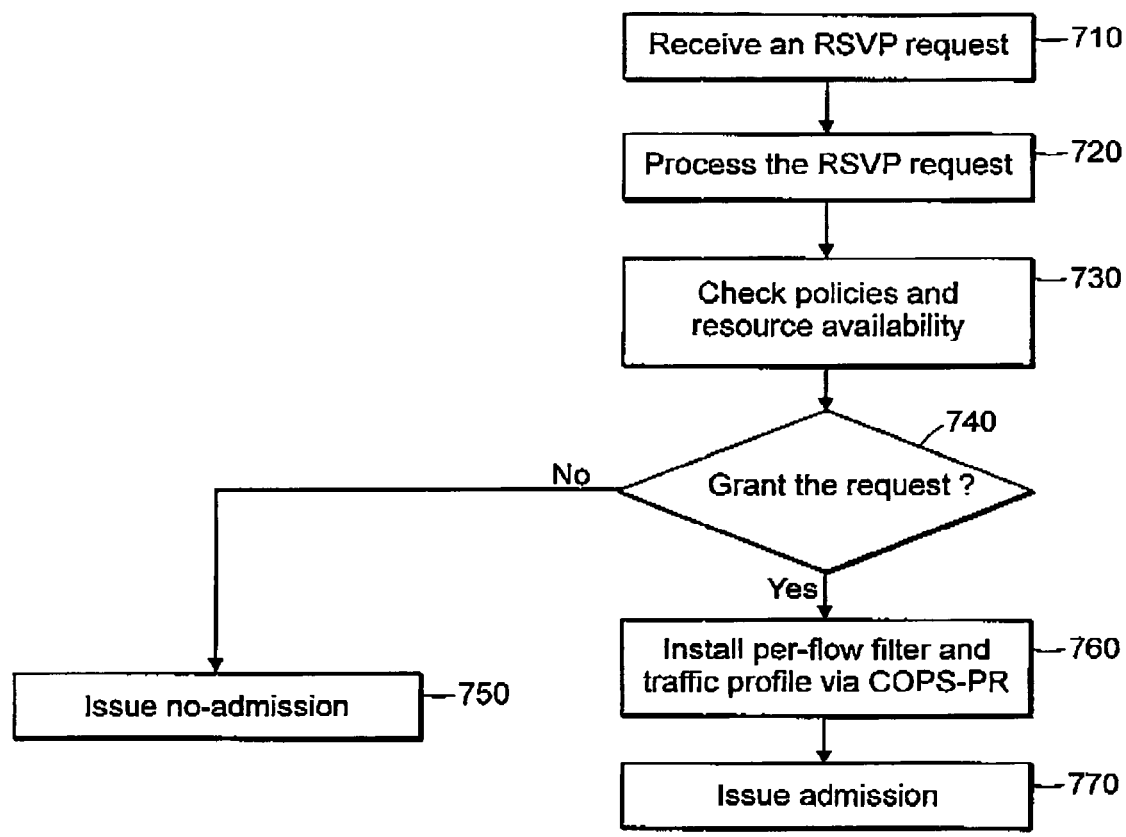
FIG. 7 is flowchart for a PDP of a DS domain.

Resource reservation in either direction is performed via the communication between an edge policy enforcement device (ingress policy enforcement device in the forward direction and egress policy enforcement device in the reverse direction) and the PDP of the same domain. FIG. 7 illustrates a flowchart for a PDP. Upon receiving a reservation request at 710, the PDP processes the request at 720 and checks with the network policies as well as the available resources of its corresponding domain at 730. If the policies allow and the requested resources are available, the PDP may decide to admit the request by installing necessary per-flow filters as well as traffic profiles at 760 via COPS-PR. The PDP then issues an admission at 770 to the requesting policy enforcement device. If the request is not granted, the PDP informs the requesting policy enforcement device its decision at 750. A successful consultation between a requesting policy enforcement device and a PDP results in required network resource being reserved at the corresponding network domain. Similar to the reservation for forward direction traffic in the first pass, when an RESV message travels hop-to-hop, network resource required for the traffic in the reverse direction are reserved at each stop. When the RESV message reaches the sender 310, the resources required for the reverse direction have been reserved along the path.

Figure 8:
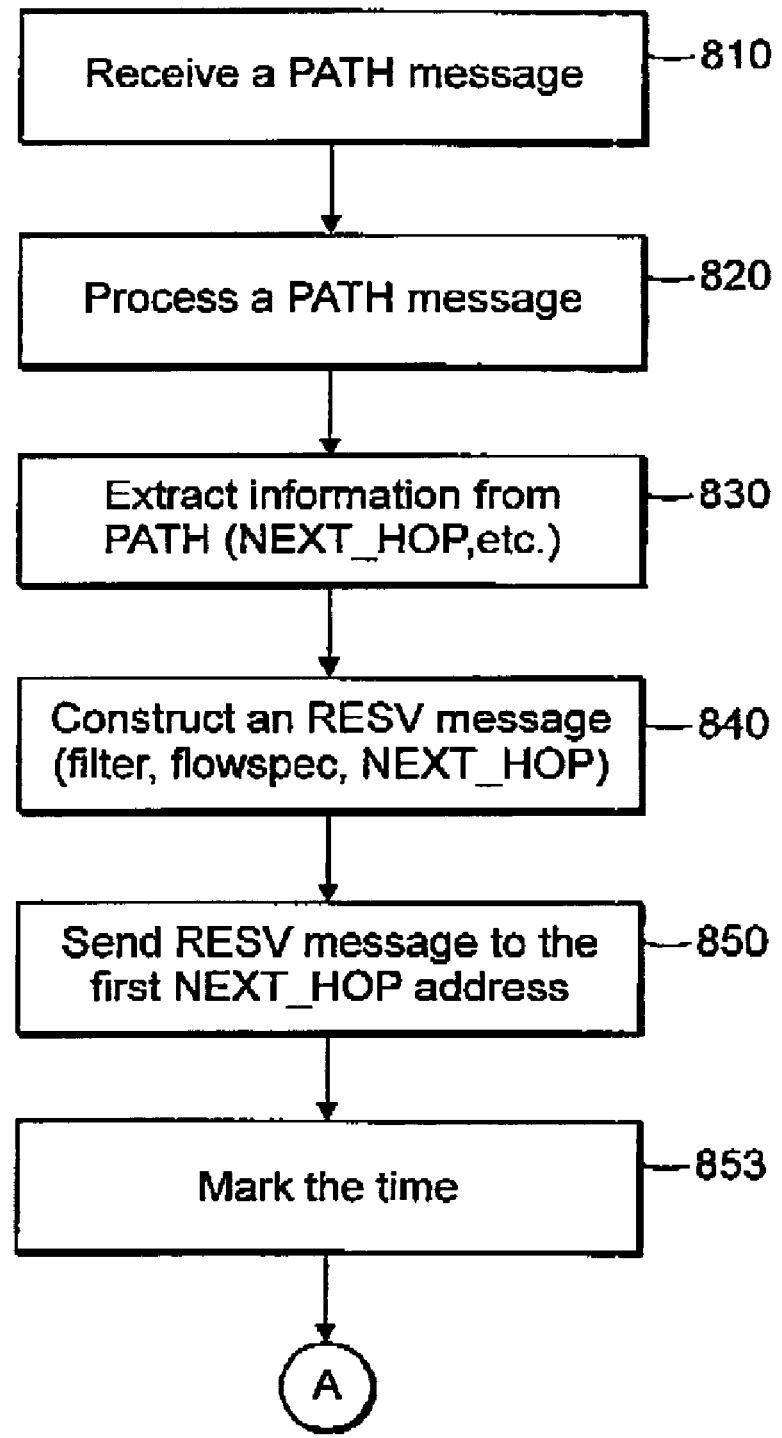
FIGS. 8 and 9 are a flowchart for the second party in a two-way communication application.
Figure 9:
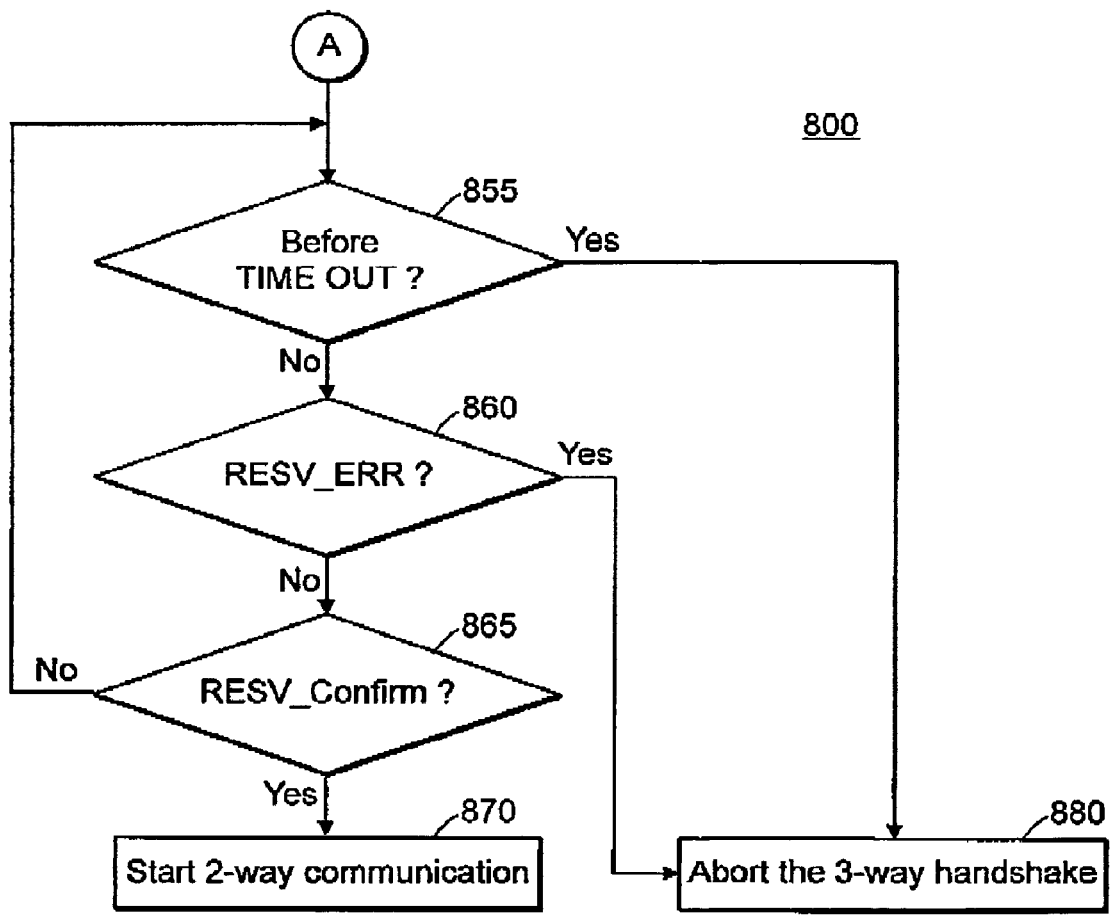

FIG. 8 and FIG. 9 show the flowchart for the receiver 320. Once the sender 310 initiates a 3-way handshake, if the receiver 320 receives a PATH message at 810, it indicates that the resource reservation for the forward direction is successful. The receiver 320 responds to the PATH message and, at the same time, initiates the reservation for the reverse direction by constructing an RESV message. To do so, the PATH message is processed at 820. The PATH message has a NEXT HOP object that provides the IP address of the $1^{st}$ router to which the RESV message must be sent. Such information may be extracted at 830 and used to construct an RESV message at 840. The RESV message generated by the receiver 320 carries both the reservation information for the reverse direction. The RESV message is sent from the receiver 320 to the egress policy enforcement device of the last domain between the sender 310 and the receiver 320. The receiver 320 marks the time at 853 to establish the time reference to be used in a time-out mechanism and then waits for return messages.

If a return message is not received before a time-out at 855, the handshake is aborted. If a return message is received within the time-out at 855 in FIG. 9, it is first examined at 860 to see whether it is an RESV_ERR message. If the received message is an RESV_ERR, it means that the resource reservation for the reverse direction has failed. In this case, the receiver 320 aborts the 3-way handshake. If the received message is an RESV_Confirm message, it signals a successful 3-way handshake, meaning that the reservation for both directions has succeeded. In this case, the receiver 320 enters a two-way communication session at 870. If the received message is neither an RESV_ERR nor an RESV_Confirm, processing returns to 855 to await the next message.

Figure 10:
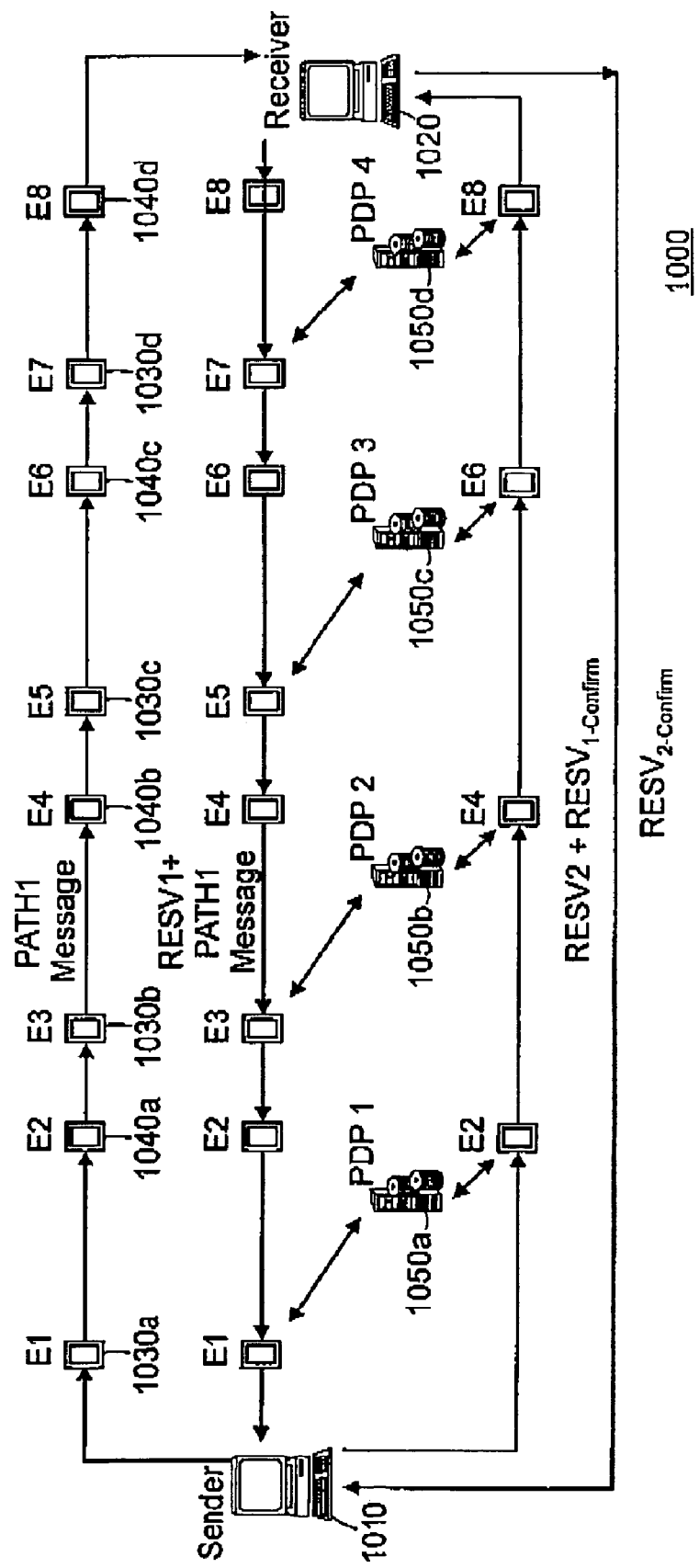
FIG. 10 illustrates a second embodiment of the invention, in which a receiver-driven RSVP scheme completes a two-directional reservation in a four-way handshake protocol.

The embodiment of the invention illustrated in FIG. 3 is a sender-driven 3-way handshake RSVP scheme that reserves network resources for both forward and reverse directions. A different embodiment of the present invention is a receiver-driven 4-way handshake RSVP scheme that reserves needed network resources in both forward and reverse directions and that supports multicast applications. FIG. 10 illustrates this embodiment of the invention, in which the two parties are 1010 (the sender) and 1020 (the receiver). Similar to the exemplary illustration in FIG. 3, there are four domains in FIG. 10. $E_1$, $E_3$, $E_5$, and $E_7$ (1030a, 1030b, 1030c, 1030d) are the ingress policy enforcement devices and $E_2$, $E_4$, $E_6$, and $E_8$ (1040a, 1040b, 1040c, 1040d) are the egress policy enforcement devices of the four illustrated network domains, looking in the direction from the sender 1010 to the receiver 1020. The PDPs for the four domains are 1050a, 1050b, 1050c, and 1050d. Both ingress and egress policy enforcement devices may communicate with their domain PDPs via COPS-RSVP to perform resource reservation.

In FIG. 10, the sender 1010 initiates a 4-way handshake. A first PATH message travels through the network, in the first pass, to probe a path between the sender 1010 and the receiver 1020. The resources needed in the forward direction are reserved in the second pass (initiated or driven by the receiver 1020). The resources needed in the reverse direction are reserved in the third pass and the reservations in the forward direction are confirmed. The last pass finishes the 4-way handshake by confirming the reservation in the reverse direction.

To start a 4-way handshake, the sender 1010 generates a first PATH message, $PATH_1$. Message $PATH_1$ does not contain reservation information. It is for probing a path from the sender 1010 to the receiver 1020. When $PATH_1$ travels from policy enforcement device to policy enforcement device, the path is recorded by adding the address of each visited edge policy enforcement device to the NEXT_HOP object of $PATH_1$. When $PATH_1$ arrives at the receiver 1020, a first RESV message, $RESV_1$ responding to $PATH_1$, is generated at the receiver 1020. $RESV_1$ carries the reservation requests for the forward traffic. At the same time, $RESV_1$ carries a PATH object, $PATH_2$, that serves as a second PATH message for the reverse direction.

The coupled $RESV_1+PATH_2$ message travels hop-by-hop to the edge policy enforcement devices of each domain. Each ingress policy enforcement device (1030a, 1030b, 1030c, 1030d) intercepts the $RESV_1$ message and performs policy and bandwidth admission control by communicating with the PDP of the same domain (1050a, 1050b, 1050c, or 1050d) using COPS-RSVP. If the request is granted, the RESV1+$PATH_2$ message is forwarded to the egress policy enforcement device (1040a, 1040b, 1040c) of the next domain to continue the reservation request along the path. When the $RESV_1+PATH_2$ message reaches the egress policy enforcement device, it ensures that its address remains as part of the NEXT_HOP object. This ensures that the $RESV_2$ message will eventually be sent to it.

When message $RESV_1/PATH_2$ reaches the sender 1010, a receiver-driven reservation for the forward direction is completed. In this case, the sender 1010 generates a message including an $RESV_1$_Confirm portion, as a response to $RESV_1$, and an $RESV_2$ portion, as a response to $PATH_2$. The former is to acknowledge the successful reservation in the forward direction while the latter is to initiate the resource reservation for the reverse direction. The sender 1010 sends the coupled $RESV_2+RESV_1$_Confirm message to the receiver 1020 via all the egress policy enforcement devices along the path. At each egress policy enforcement device, based on the reservation request carried by $RESV_2$, policy and bandwidth admission control is performed by consulting with the PDP of the corresponding domain using COPS-RSVP. If the reservation is admitted, the PDP installs necessary per-flow filters and traffic profiles via COPS-PR. If message $RESV_2+RESV_1$_Confirm successfully reaches the receiver 1020, the reservation in both directions is completed. The receiver 1020 then generates a $RESV_2$_Confirm message and sends it directly to the sender 1010 to complete the 4-way handshake.

In the embodiment illustrated in FIG. 10, a two-way reservation is considered successful only when the admission control decisions are granted in both forward and reverse directions. A failure in reserving the network resources needed in the forward direction at any ingress policy enforcement device may be signaled by sending an RESV_ERR message from that policy enforcement device to the receiver 1020. A failure in reserving the network resource needed in the reverse direction at any egress policy enforcement device may be signaled by sending an RESV_ERR message back to the sender 1010.

Figure 11:
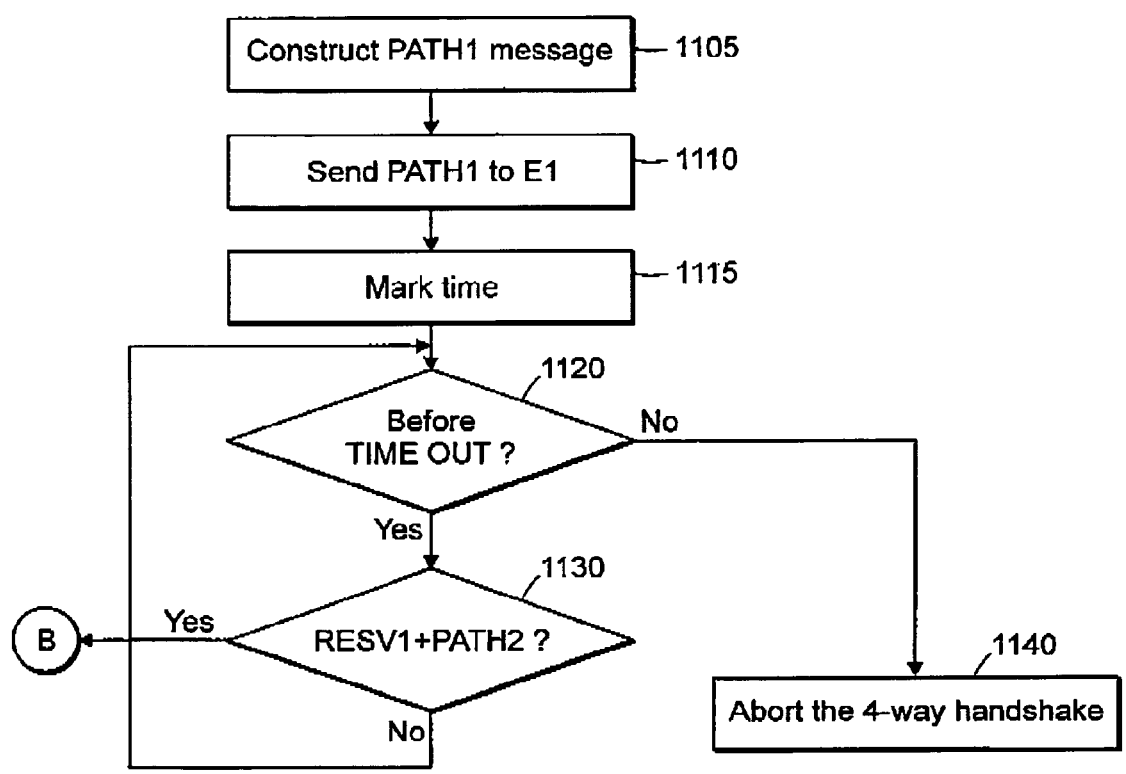
FIGS. 11 through 13 present a flowchart for the first party in the second embodiment, who initiates the two-way communication.
Figure 12:
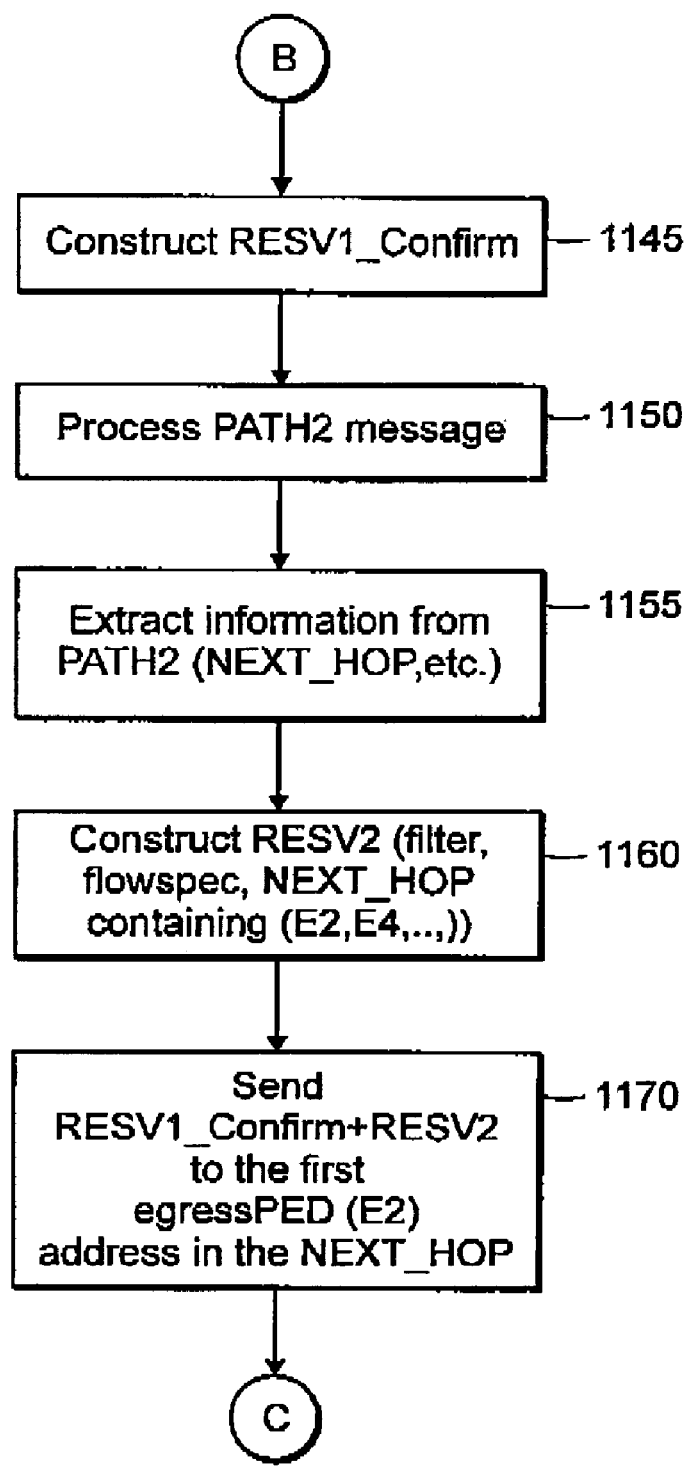
Figure 13:
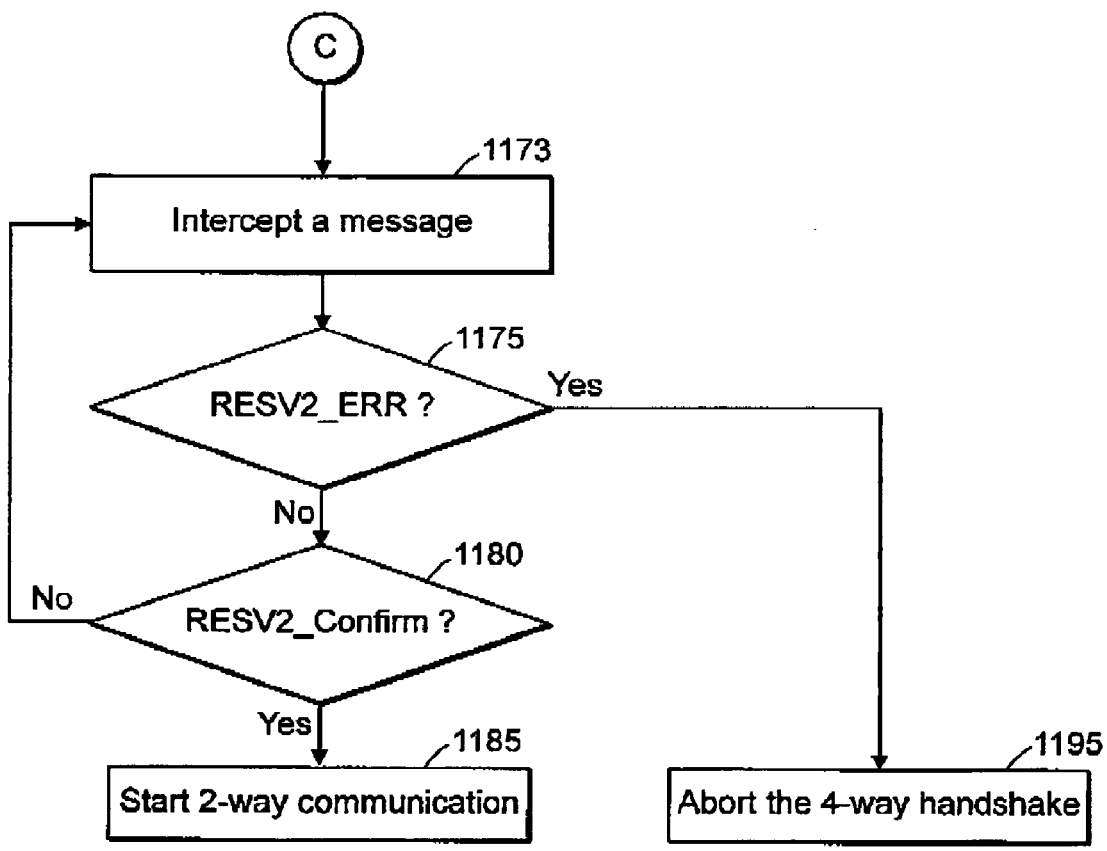

FIG. 11–13 show a flowchart for the sender 1010. To initiate a 4-way handshake, the sender 1010 constructs the first PATH messge, $PATH_1$, at 1105. Message $PATH_1$ is sent at 1110 and the time may be marked at 1115 so that a first reference time for a time-out mechanism may be established. The sender 1010 then waits for a return message.

If a message is received before a time-out at 1120, the message type is determined at act 1130. If it is not an $RESV_1+PATH_2$ message, the sender 1010 goes back to 1120 to wait. If the time-out condition is satisfied at 1120, the sender 1010 aborts the 4-way handshake. A time-out tells the sender 1010 that the forward direction reservation failed and an $RESV_1$_ERR message will be sent, in this case, to the receiver 1020.

If the received message is an $RESV_1+PATH_2$, it indicates that the reservation in the forward direction has been successful. In this case, the sender 1010 constructs a third message, a coupled $RESV_1$_Confirm+$RESV_2$ message. The former is to acknowledge received $RESV_1$ and the latter is to initiate the reservation for the reverse direction. An $RESV_1$_Confirm message is generated at 1145 of FIG. 12. At the same time, the sender 1010 constructs a $RESV_2$ message. To do so, the $PATH_2$ message is processed at 1150. The NEXT_HOP object of $PATH_2$ is constructed in the second pass, during which egress policy enforcement devices add their addresses to the NEXT_HOP object of $PATH_2$ so that the path represented by the NEXT_HOP object contains only the egress policy enforcement devices.

The NEXT_HOP from $PATH_2$ is used to construct the $RESV_2$ message at 1160. The coupled $RESV_1$_Confirm+$RESV_2$ message is sent to the receiver 1020 at 1170, traveling through only egress policy enforcement devices in the forward direction. The sender 1010 then waits for either an error message $RESV_2$_ERR, informing the sender 1010 that the reservation for the reverse direction fails, or a confirmation message $RESV_2$_Confirm, indicating that the reservation for the reverse direction succeeds.

The sender 1010 intercepts a message at act 1173. If the message is an $RESV_2$_ERR, determined at 1175, the sender 1010 aborts the 4-way handshake at 1195. If the message is an $RESV_2$_Confirm, determined at act 1180, it means that the reservation for both directions (forward and reverse) has been successful and the four-way handshake is complete. The corresponding two-way communication, in this case, may be started at 1185.

Figure 14:
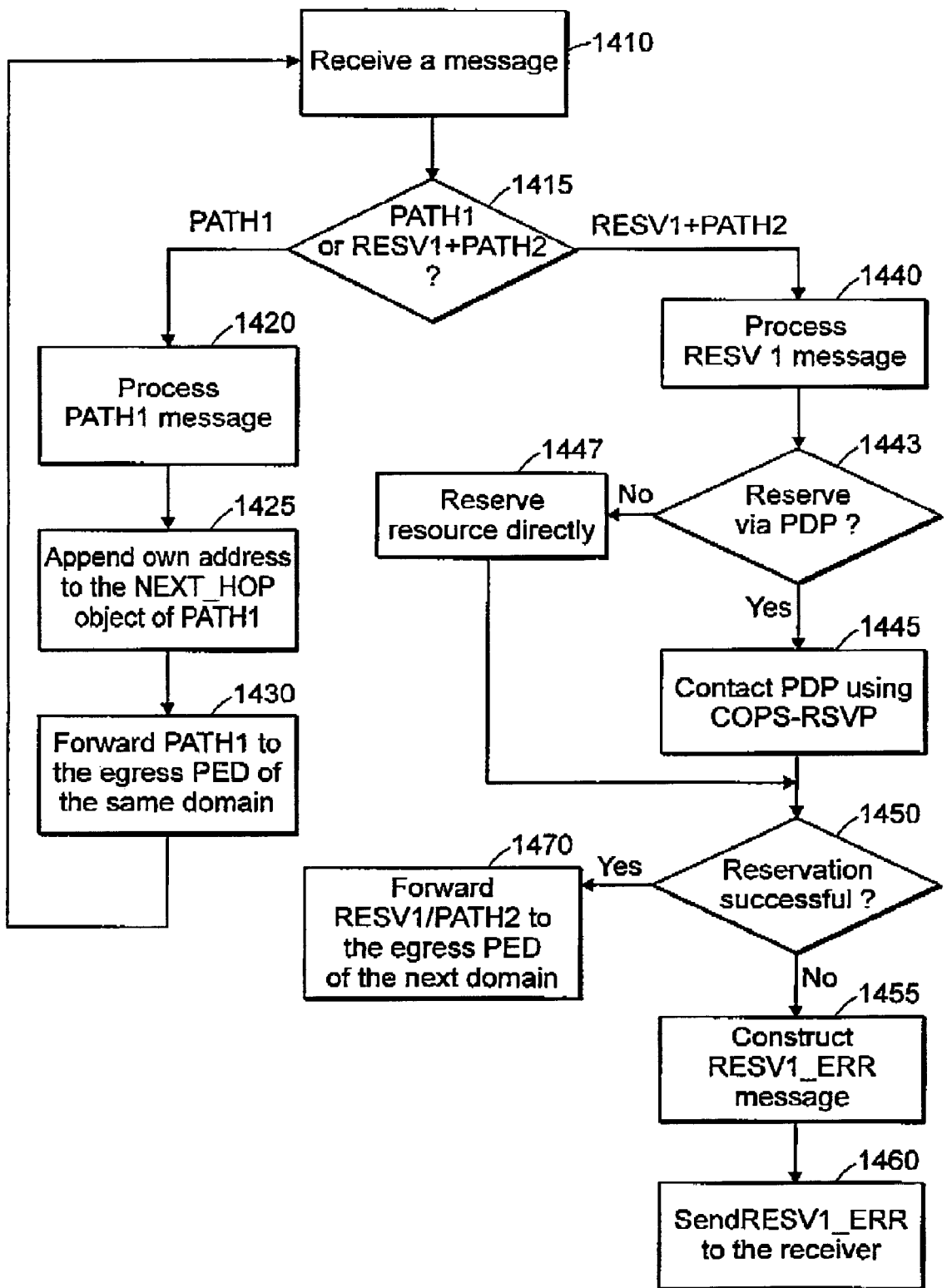
FIG. 14 is a flowchart for an ingress policy enforcement device of a DS domain in the second embodiment.

In the RSVP reservation scheme shown in FIG. 10, an ingress policy enforcement device performs different functions, depending on the type of message it receives. In the first pass, an ingress policy enforcement device receives a $PATH_1$ message. In the second pass, an ingress policy enforcement device receives a coupled $RESV_1+PATH_2$ message. FIG. 14 shows the flowchart for an ingress policy enforcement device in a four-way handshake scheme.

Upon intercepting a message at an ingress policy enforcement device at 1410, the message type is examined at 1415. If the received message is a $PATH_1$ message, it is in the first pass of the 4-way handshake. In this case, the ingress policy enforcement device processes $PATH_1$ and add its own address to the NEXT_HOP object of $PATH_1$ at 1425 that ensures that the $RESV_1+PATH_2$ message will be sent to this ingress policy enforcement device. The revised $PATH_1$ message is then forwarded toward the egress policy enforcement device of the same network domain at 1430. The ingress policy enforcement device then returns to a receiving mode at 1410.

If the received message is a $RESV_1+PATH_2$ message, it is in the second pass of the 4-way handshake. In this pass, an ingress policy enforcement device performs both the function of reserving resources needed for the forward direction (based on the $RESV_1$ message).

To reserve requested resources for the forward direction, the ingress policy enforcement device processes $RESV_1$ message at 1440. Whether the resources are to be reserved through the PDP is determined at act 1443. If the reservation is to be made through the PDP, the policy enforcement device communicates with the PDP of the same domain at 1445. The communication may be performed using protocol COPS-RSVP. Based on available resources and the network policies, the PDP decides whether the resource request for the forward direction will be granted or not. Such a decision is communicated back to the ingress policy enforcement device.

The policy enforcement device may also reserve the resource directly at act 1447. If the reservation is successful, determined at act 1450, the ingress policy enforcement device forwards the received $RESV_1+PATH_2$ message at 1470 to the egress policy enforcement device of the next domain in the reverse direction. If the request for the resources required in forward direction is not granted (at 1450), the reservation fails. In this case, the ingress policy enforcement device constructs an error message $RESV_1\_ERR$ at 1455 and sends it at 1460 to the receiver 1020, signaling a failure in reserving required resources in the forward direction.

Figure 15:
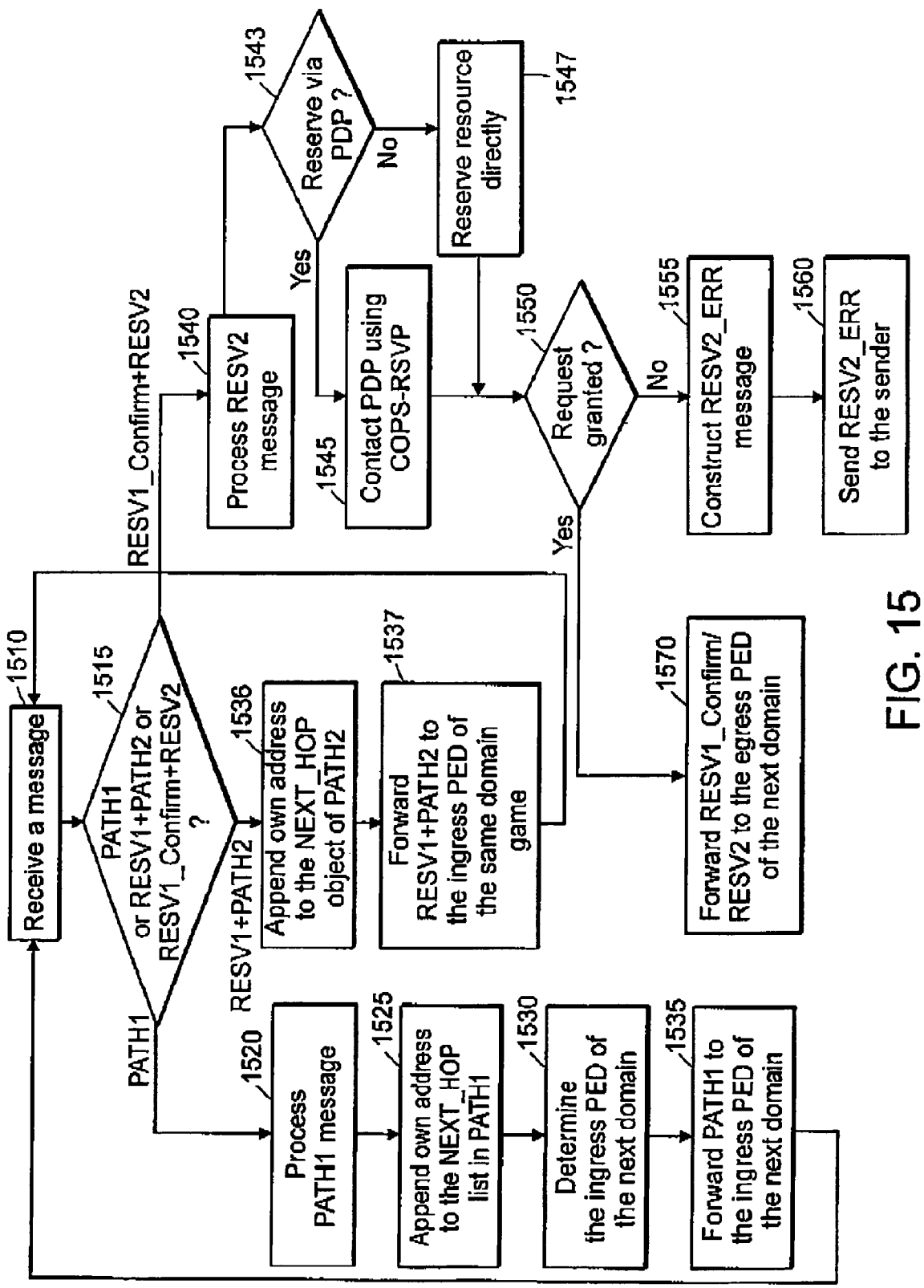
FIG. 15 is a flowchart for an egress policy enforcement device of a DS domain in the second embodiment.

As described in FIG. 10, an egress policy enforcement device in a 4-way handshake may receive three types of messages. A $PATH_1$ message passes through egress policy enforcement devices in the first pass, an $RESV_1+PATH_2$ message passes through egress policy enforcement devices in the second pass, and an $RESV_2+RESV_1\_Confirm$ message passes through egress policy enforcement devices in the third pass. Depending on the type of the received message, an egress policy enforcement device performs different functions. FIG. 15 presents a flowchart for an egress policy enforcement device in a four-way handshake scheme.

When a message is received at an egress policy enforcement device at 1510, its type is examined at 1515. As depicted in FIG. 15, if the received message is a $PATH_1$ message, the egress policy enforcement device processes the received $PATH_1$ message at 1520 and adds its own address to the NEXT_HOP object of $PATH_1$ at 1525. The revised $PATH_1$ is sent to the ingress policy enforcement device of the next domain in forward direction at 1535. The egress policy enforcement device then waits to receive the next message at 1510.

If the message received at 1510 is an $RESV_1+PATH_2$ message, the egress policy enforcement device adds its own address to the NEXT_HOP object of $PATH_2$ at 1536 and forwards the $RESV_1+PATH_2$ message at 1537 to the ingress policy enforcement device of the same domain. The egress policy enforcement device then goes back to a waiting mode at 1510 to intercept the next message.

If the message received at 1510 is a coupled $RESV_2+RESV_1\_Confirm$ message, it indicates that the resources needed for the forward direction have been successfully reserved and the reservation for the reverse direction needs to be made. The received $RESV_2$ message is originated at the sender 1010, carrying the reservation request for the reverse direction. $RESV_2$ message is processed at 1540.

Based on the reservation request in $RESV_2$, the egress policy enforcement device reserves needed resource either through the PDP at act 1545 or directly at act 1547, depending on the decision made at act 1543 in terms of how the resource is to be reserved. If the reservation is successful, determined at act 1550, the egress policy enforcement device forwards the $RESV_2+RESV_1\_Confirm$ message at 1570 to the next egress policy enforcement device, using the addresses defined in the NEXT_HOP object of $RESV_2$ message. If the reservation request is not granted, the egress policy enforcement device constructs a $RESV_2\_ERR$ message at 1555 and sends it at 1560 back to the sender 1010, informing the receiver 1020 that the reservation request initiated by the receiver 1020 in the reverse direction has failed.

Figure 16:
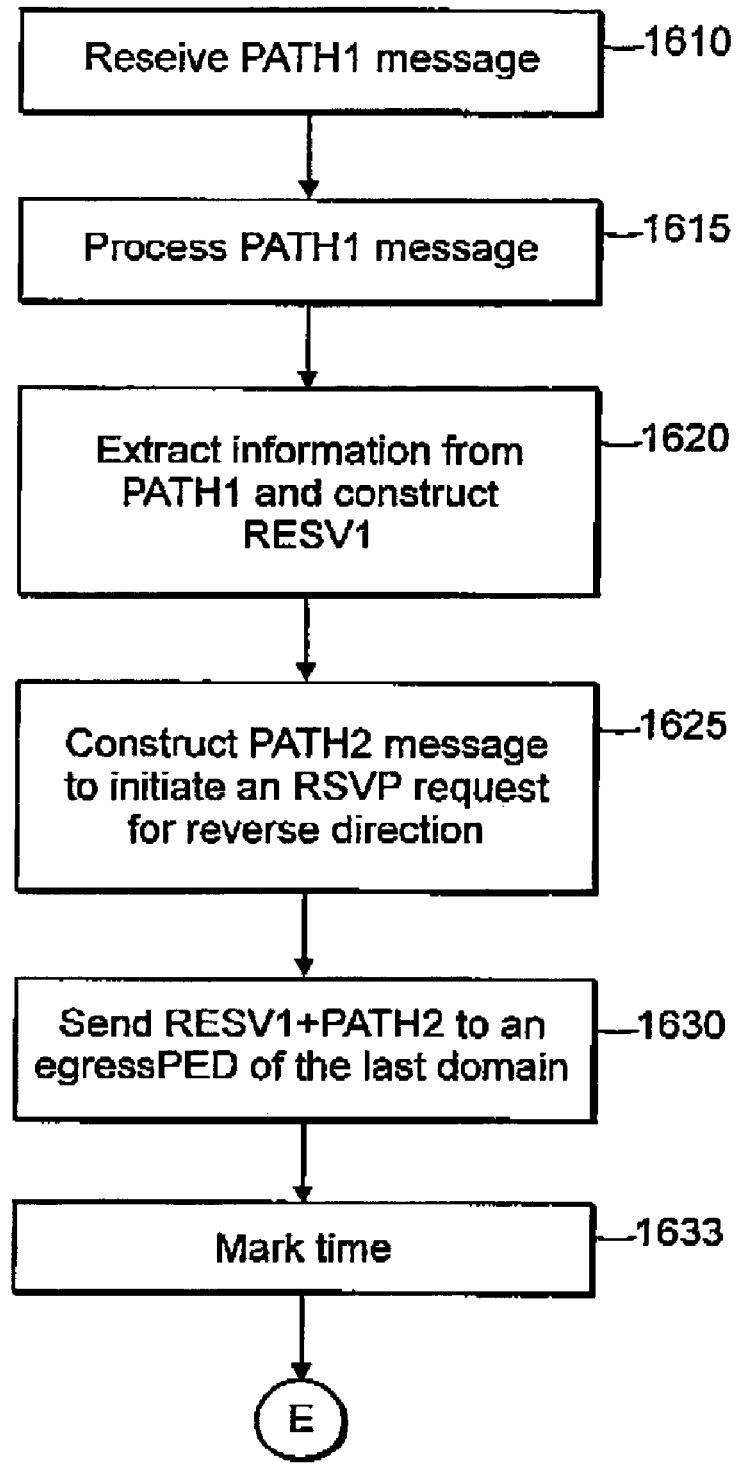
FIGS. 16 and 17 are a flowchart for the second party in the second embodiment.
Figure 17:
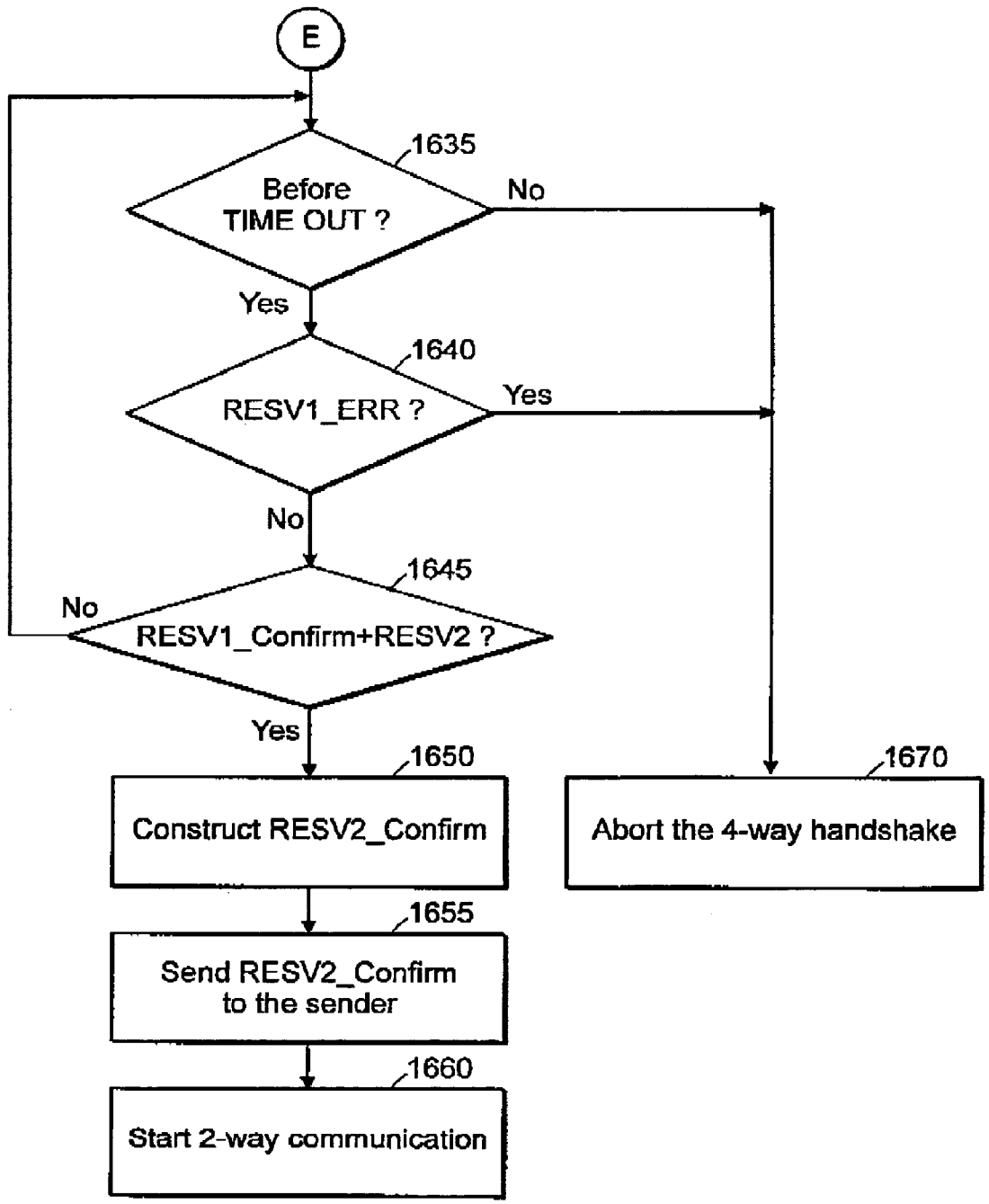

FIG. 16 and FIG. 17 show the flowchart for the receiver 1020 in a 4-way handshake scheme. After the 4-way handshake is initiated by the sender 1010, the receiver 1020 receives the PATH1 message and uses it to construct the RESV1 message which is sent back to the sender. The RESV1 message carries the reservation request for the forward direction and travels along the reverse path as the PATH1 message. The receiver determines the op address of the $1^{st}$ egress router using the NEXT_HOP object in the PATH1 message."

The receiver 1020, at the same time, also constructs a $PATH_2$ message that serves as the PATH message of the resource reservation for the reverse direction. The receiver 1020 then sends the coupled $RESV_1+PATH_2$ message at 1630 to the first egress policy enforcement device in the reverse direction. This starts the second pass of the 4-way handshake. Message $RESV_1+PATH_2$ travels hop-by-hop to all the edge policy enforcement devices in the reverse direction. Along this reverse path, the reservation for the forward direction may be made, based on $RESV_1$, at each of the ingress policy enforcement devices. Also in this second pass, the reverse path defined by egress policy enforcement devices only, is constructed, along the way, and the addresses of the egress policy enforcement devices in the reverse path are recorded in $PATH_2$ message as the NEXT_HOP object of $PATH_2$ and it provides the path for the third pass of the 4-way handshake, in which the resource reservation for the reverse direction will be made.

Once the $RESV_1+PATH_2$ message is passed on, the receiver 1020 enters a waiting mode for return messages.

The receiver 1020 may mark the time (at 1633) so that a reference time for a time-out mechanism may be established.

A return message received at the receiver 1020 may be an $RESV_1\_ERR$ message, which indicates that the reservation initiated by the receiver has failed, or a coupled $RESV_1\_m$ Confirm/$RESV_2$ message, which indicates that the reservation in both directions has succeeded. Depending on the type of message received the receiver 1020 functions differently, as illustrated in FIG. 17. If a message is received and the received message is an $RESV_2\_ERR$ message at 1640, the receiver 1020 also aborts the 4-way handshake at 1670. If the timely received message is an $RESV_2/RESV_1\_$Confirm message at 1645, the receiver 1020 constructs an acknowledgement message RESV2__Confirm at 1690 and sends it directly back to the sender 1010 at 1655 to complete the 4-way handshake. A 2-way communication may then be staffed at 1660.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method comprising: sending a first message from a first party to a second party via a first policy enforcement device, said first message carrying a resource reservation request for communication from said first party to said second party, said first policy enforcement device connecting to a network; sending a second message from said second party to said first party via a second policy enforcement device, said second message acknowledging the first message, said second message carrying a resource reservation request for communication from said second party to said first party, said second policy enforcement device connecting to a network; and sending a third message from said first party to said second party, said third message acknowledging said second message.

2. The method of claim 1, wherein said first message includes a PATH message; said second message includes an RESV message; said third message includes an RESV confirmation message; said policy enforcement device includes an edge router; said policy enforcement device includes a multiplexer; said first party is the initiating party between two participants in a two-way communication; and said second party is the non-initiating party of the two participants in said two-way communication.

3. The method of claim 1, further comprising: reserving a first resource needed for the communication from said first party to said second party according to the resource reservation request carried in said first message; and probing a network path between said first party and said second party, said network path being defined by at least one policy enforcement device address and stored in said first message, said first message traveling along said network path.

4. The method of claim 1, further comprising: reserving a second resource needed for the communication from said second party to said first party according to the resource reservation request carried in said second message.

5. A method for a first party initiating a two-way communication, comprising: constructing a PATH message, said PATH message carrying a resource reservation request; sending said PATH message to a policy enforcement device, said policy enforcement device connecting to a network; receiving a message from said policy enforcement device, said message being either a PATH_ERR message or an RESV message, said message resulting from said sending of the PATH message; sending an RESV_Confirm message to said policy enforcement device if said message is an RESV message; and aborting the initiating of said communication if said message is a PATH_ERR message.

6. A method for an ingress policy enforcement device, said ingress being defined in the direction from a first party to a second party, said first party initiating a two-way communication, said ingress policy enforcement device connecting to a network, said method comprising: intercepting a PATH message, said PATH message carrying a resource reservation request; reserving needed network resource according to the resource reservation request carried in said PATH message, said reserving yielding a decision or either positive, representing granting the needed network resources, or negative, representing not granting the needed network resources; forwarding said PATH message to an egress policy enforcement device if said decision is positive, said egress policy enforcement device connecting to the same network as said ingress policy enforcement device; and sending a PATH_ERR message to said first party if said decision is negative.

7. A method for an egress policy enforcement device, said egress being defined in the direction from a first party to a second party, said first party initiating a two-way communication, said egress policy enforcement device connecting to a network, said method comprising: intercepting a message, said message being either a PATH message or an RESV message, said PATH message carrying a resource reservation request for communication from said first party to said second party, said RESV message carrying path information and a resource reservation request for communication from said second party to said first party; adding an address to said PATH message if said message is a PATH message, said address identifying said egress policy enforcement device, said adding resulting in a revised PATH message; determining a forwarding address for forwarding said revised PATH message; forwarding said revised PATH message to said forwarding address; reserving needed network resource if said message is an RESV message, said needed network resource being specified by the resource reservation request carried in said RESV message, said reserving yielding a decision of either positive, representing granting the needed network resource, or negative, representing not granting the needed network resource; determining a next hop address if said decision is positive, said next hop address being determined from the path information carried in said RESV message; forwarding said RESV message to said next hop address; and sending an RESV_ERR message to said second party if said decision is negative.

8. A method for a second party being the non-initiating party between two participants in a two-way communication, comprising: intercepting a PATH message; sending an RESV message to a policy enforcement device as a response to the PATH message intercepted by said intercepting, said RESV message carrying path information and a resource reservation request, said policy enforcement device connecting to a network; receiving a message, said message resulting from said sending of said RESV message, said message being either a RESV_ERR message or a RESV_Confirm message; entering a two-way communication session if said message is said RESV_Confirm message; and aborting the initiation of said communication if said message is an RESV_ERR message.

9. A method comprising: sending a first message from a first party to a second party via a first policy enforcement device, said first policy enforcement device connecting to a network, sending a second message from said second party to said first party via a second policy enforcement device, said second message acknowledging the first message, said second message carrying a resource reservation request for the communication from said first party to said second party, said second policy enforcement device connecting to a network; sending a third message from said first party to said second party via a third policy enforcement device, said third message acknowledging said second message, said third message carrying a resource reservation request for the communication from said second party to said first party, said third policy enforcement device connecting to a network; and sending a fourth message from said second party to said first party, said fourth message acknowledging said third message.

10. The method of claim 9, wherein said first message includes a PATH message; said second message includes an RESV+PATH message; said third message includes an RESV_Confirm+RESV message; said fourth message includes an RESV_Confirm message; said policy enforcement device includes an edge router; said policy enforcement device includes a multiplexer; said first party initiates a two-way communication with at least one said second party; and said second party is an non-initiating party in said two-way communication.

11. The method of claim 9, further comprising: probing a network path between said first party and said second party, said network path being defined by at least one policy enforcement device address and being stored in said first message.

12. The method of claim 9, further comprising: reserving a first resource needed for the communication from said first party to said second party according to the resource reservation request carried in said second message; and probing a network path between said second party and said first party, said network path being defined by at least one policy enforcement device address and being stored in said second message.

13. The method of claim 9, further comprising: reserving a second resource needed for the communication from said second party to said first party according to the resource reservation request carried in said third message.

14. A method for a first party initiating a two-way communication, comprising: constructing a PATH message; sending said PATH message to a policy enforcement device, said policy enforcement device connecting to a network, receiving a first message from said policy enforcement device, said first message being a RESV+PATH message, said first message resulting from said sending of said PATH message; aborting the initiating of said communication if said first message is an RESV_ERR message; sending an RESV_Confirm+RESV message to said policy enforcement device if said first message is an RESV+PATH message; receiving a second message from said policy enforcement device, said second message being either an RESV_ERR message or an RESV_Confirm message, said second message resulting from said sending of an RESV_Confirm+RESV message; and entering a two-way communication session as a response to said second message.

15. A method for an ingress policy enforcement device, said ingress being defined in the direction from a first party to a second party, said first party initiating a two-way communication, said ingress policy enforcement device connecting to a network, said method comprising: intercepting a message, said message being either a PATH message or an RESV+PATH message, said RESV+PATH message carrying both path information and a resource reservation request for the communication from said first party to said second party; adding an address to said PATH message if said message is a PATH message, said address identifying said ingress policy enforcement device, said adding resulting in a revised PATH message; determining a forwarding address for forwarding said revised PATH message; forwarding said revised PATH message to said forwarding address; reserving needed network resource if said message is an RESV+PATH message, said needed network resource being specified by the resource reservation request carried in said RESV+PATH message, said reserving yielding a decision of either positive, representing granting the needed network resource, or negative, representing not granting the needed network resource; determining a next hop address if said decision is positive, said next hop address being determined from the path information carried in said RESV+PATH message; forwarding said RESV+PATH message to said next hop address; and sending an RESV_ERR message to said second party if said decision is negative.

16. A method for an egress policy enforcement device, said egress being defined in the direction from a first party to a second party, said first party initiating a two-way communication, said egress policy enforcement device connecting to a network, said method comprising: intercepting a message, said message being a PATH message, an RESV+PATH message, or an RESV_Confirm+RESV message, said RESV+PATH carrying path information and a resource reservation request for the communication from said first party to said second party, said RESV_Confirm+RESV carrying path information and a resource reservation request for the communication from said second party to said first party; adding an address to said PATH message if said message is a PATH message, said address identifying said egress policy enforcement device, said adding an address resulting in a revised PATH message; determining a hop address for forwarding said revised PATH message; forwarding said revised PATH message to said hop address; adding said address to said RESV+PATH message if said message is an RESV+PATH message, said adding said resulting in a revised RESV+PATH message; determining a next hop address for forwarding said revised RESV+PATH message, said next hop address being determined from the path information carried in said RESV+PATH message; forwarding said revised RESV+PATH message to said next hop address; reserving needed network resource if said message is an RESV_Confirm+RESV message, said needed network resources being specified by the resource reservation request carried in said RESV_Confirm+RESV message, said reserving yielding a decision of either positive, representing granting the needed network resource, or negative, representing not granting the needed network resource; determining a next hop address if said decision is positive, said next hop address being determined from the path information carried in said RESV_Confirm+RESV message; forwarding said RESV_Confirm+RESV message to said next hop address; and sending an RESV_ERR message to said first party if said decision is negative.

17. A method for a second party, said second party being the non-initiating party of the two participants in a two-way communication, said method comprising: intercepting a PATH message; sending an RESV+PATH message to a policy enforcement device as a response to said PATH message intercepted by said intercepting, said RESV+PATH message carrying path information and a resource reservation request for the communication from said first party to said second party, said policy enforcement device connecting to a network; receiving a message, said message being either an RESV_ERR message or an RESV_Confirm+RESV message, said message resulting from said sending of an RESV+PATH message; sending an RESV_Confirm message to a first party if said message is an RESV_Confirm_RESV message, said first party being the initiating party in said two-way communication; and entering a two-way communication session after said sending of an RESV_Confirm message.

18. A system comprising: a sender to initiate a two-way communication by sending a first message, said first message carrying a resource reservation request for the communication in a forward direction initiated from said sender, said sender receiving a second message carrying path information and a resource reservation request for the communication in a reverse direction ending at said sender, said sender responding to the second message by sending a third message before said two-way communication session starts; at least one ingress policy enforcement device, where ingress is defined according to said forward direction, said at least one ingress policy enforcement device receiving said first message sent by said sender and reserving needed network resource according to the resource reservation request carried in said first message, said at least one ingress policy enforcement device forwarding said first message if the requested network resources are granted; at least one egress policy enforcement device, where egress is defined according to the forward direction, said at least one egress policy enforcement device receiving both the first message sent by said sender via one of said at least one ingress policy enforcement device and the second message, adding its own address to said first message before forwarding the first message, reserving needed network resource according to the resource reservation request carried in said second message before forwarding the second message, and forwarding the second message according to the path information carried in said second message if the network resources requested by said requesting are granted; and a receiver, said receiver being the non-initiating party in said two-way communication, said receiver receiving said first message sent by said sender, responding the first message by sending said second message to the sender, said second message being sent via one of said at least one egress policy enforcement device connecting the receiver and a network, the receiver entering said two-way communication session after receiving said third message sent directly from the sender.

19. An apparatus for a sender initiating a two-way communication, comprising: means for constructing a PATH message, said PATH message carrying a resource reservation request; means for sending said PATH message to a policy enforcement device, said policy enforcement device connecting to a network; means for receiving a message from said policy enforcement device, said message being either a PATH_ERR message or an RESV message, said message resulting from said sending of the PATH message; means for sending an RESV_Confirm message to said policy enforcement device if said message is an RESV message; and means for aborting the initiating of said communication if said message is a PATH_ERR message.

20. An apparatus for an ingress policy enforcement device, said ingress being defined in the direction from a sender to a receiver, said sender initiating a two-way communication, said ingress policy enforcement device connecting to a network, comprising: means for intercepting a PATH message, said PATH message carrying a resource reservation request; means for reserving needed network resource according to the resource reservation request carried in said PATH message, said reserving yielding a decision of either positive, representing granting the needed network resource, or negative, representing not granting the needed network resource; means for forwarding said PATH message to an egress policy enforcement device if said decision is positive, said egress policy enforcement device connecting to the same network as said ingress policy enforcement device; and means for sending a PATH_ERR message to said first party if said decision is negative.

21. An apparatus for an egress policy enforcement device, said egress being defined in the direction from a sender to a receiver, said sender initiating a two-way communication, said egress policy enforcement device connecting to a network, comprising: means for intercepting a message, said message being either a PATH message or an RESV message, said PATH message carrying a resource reservation request for communication from said first party to said second party, said RESV message carrying path information and a resource reservation request for communication from said second party to said first party; means for adding an address to said PATH message if said message is a PATH message, said address identifying said egress policy enforcement device, said adding resulting in a revised PATH message; means for determining a forwarding address for forwarding said revised PATH message; means for forwarding said revised PATH message to said forwarding address; means for reserving needed network resource if said message is an RESV message, said needed network resource being specified by the resource reservation request carried in said RESV message, said reserving yielding a decision of either positive, representing granting the needed network resource, or negative, representing not granting the needed network resource; means for determining a next hop address if said decision is positive, said next hop address being determined from the path information carried in said RESV message; means for forwarding said RESV message to said next hop address; and means for sending an RESV_ERR message to said second party if said decision is negative.

22. An apparatus for a receiver being the non-initiating party between two participants in a two-way communication, comprising: means for intercepting a PATH message; means for sending an RESV message to a policy enforcement device as a response to the PATH message intercepted by said intercepting, said RESV message carrying path information and a resource reservation request, said policy enforcement device connecting to a network means for receiving a message said message resulting from said sending of said RESV message, said message being either a RESV_ERR message or an RESV_Confirm message; means for entering a two-way communication session if said message is said RESV_Confirm message; and means for aborting the initiation of said communication if said message is an RESV_ERR message.

23. A system comprising: a sender to initiate a communication session by sending a first message, said sender receiving at least one second message, each of said at least one second message carrying a resource reservation request for the communication in a forward direction initiated from said sender, said sender responding said second message by sending a third message carrying path information and a resource reservation request for the communication in a reverse direction ending at said sender, the sender entering said communication session after receiving a fourth message; at least one ingress policy enforcement device, where ingress is defined according to said forward direction, each of said at least one ingress policy enforcement device receiving both the first message sent by said sender and the second message, forwarding the first message in said forward direction, reserving needed network resource according to the resource reservation request carried in said second message before forwarding said second message, forwarding said second message in said reverse direction according to the path information carried in the second message if the requested network resources are granted at least one egress policy enforcement device, where egress is defined according to said forward direction, each of said at least one egress policy enforcement device receiving said first, said second, and said third messages, adding its own address to the first message before forwarding the first message, adding its own address to said second message before forwarding the second message according to the path information carried in the second message, reserving needed network resource according to the resource reservation request carried in said third message before forwarding the third message, forwarding the third message according to the path information carried in the third message if the requested network resources are granted; and at least one receiver being the non-initiating party in said communication session, each of said at least one receiver responding the sender, after receiving the first message, by sending said second message to the sender, said receiver receiving, from the sender, the third message, the first message and the third messages being received and the second message being sent by each of said at least one receiver via said at least one egress policy enforcement device connecting said receiver and a network, said receiver sending the fourth message directly to the sender before said communication session starts.

24. An apparatus for a sender initiating a two-way communication, comprising: means for constructing a PATH message; means for sending said PATH message to a policy enforcement device, said policy enforcement device connecting to a network; means for receiving a first message from said policy enforcement device, said first message being an RESV+PATH message, said first message resulting from said sending of said PATH message; means for aborting the initiating of said communication if said first message is an RESV_ERR message; means for sending an RESV_Confirm+RESV message to said policy enforcement device if said first message is an RESV+PATH message; means for receiving a second message from said policy enforcement device, said second message being either an RESV_ERR or an RESV_Confirm message, said second message resulting from said sending of an RESV_Confirm+RESV message; and means for entering a two-way communication session as a response to said second message.

25. An apparatus for an ingress policy enforcement device, said ingress being defined in the direction from a sender to a receiver, said sender initiating a two-way communication, said ingress policy enforcement device connecting to a network, said apparatus comprising: means for intercepting a message, said message being either a PATH message or an RESV+PATH message, said RESV+PATH message carrying both path information and a resource reservation request for the communication from said first party to said second party; means for adding an address to said PATH message if said message is a PATH message, said address identifying said ingress policy enforcement device, said adding resulting in a revised PATH message; means for determining a forwarding address for forwarding said revised PATH message; means for forwarding said revised PATH message to said forwarding address; means for reserving needed network resource if said message is an RESV+PATH message, said needed network resources being specified by the resource reservation request carried in said RESV+PATH message, said reserving yielding a decision of either positive, representing granting the needed network resource, or negative, representing not granting the needed network resource; means for determining a next hop address if said decision is positive, said next hop address being determined from the path information carried in said RESV+PATH message; means for forwarding said RESV+PATH message to said next hop address; and means for sending an RESV_ERR message to said second party if said decision is negative.

26. An apparatus for an egress policy enforcement device, said egress being defined in the direction from a sender to a receiver, said sender initiating a two-way communication, said egress policy enforcement device connecting to a network, said apparatus comprising: means for intercepting a message, said message being a PATH message, an RESV+PATH message, or an RESV_Confirm+RESV message, said RESV+PATH carrying path information and a resource reservation request for the communication from said first party to said second party, said RESV_Confirm+RESV carrying path information and a resource reservation request for the communication from said second party to said first party; means for adding an address to said PATH message if said message is a PATH message, said address identifying said egress policy enforcement device, said adding an address resulting in a revised PATH message; means for determining a hop address for forwarding said revised PATH message; means for forwarding said revised PATH message to said hop address; means for adding said address to said RESV+PATH message if said message is an RESV+PATH message, said adding said resulting in a revised RESV+PATH message; means for determining a next hop address for forwarding said revised RESV+PATH message, said next hop address being determined from the path information carried in said RESV+PATH message; means for forwarding said revised RESV+PATH message to said next hop address; means for reserving needed network resource if said message is an RESV_Confirm+RESV message, said needed network resource being specified by the resource reservation request carried in said RESV_Confirm+RESV message, said reserving yielding a decision of either positive, representing granting the needed network resource, or negative, representing not granting the needed network resource; means for determining a next hop address if said decision is positive, said next hop address being determined from the path information carried m said RESV_Confirm+RESV message; means for forwarding said RESV_Confirm+RESV message to said next hop address; and means for sending an RESV_ERR message to said first party if said decision is negative.

27. An apparatus for a receiver, said receiver being the non-initiating party of the two participants in a two-way communication, said apparatus comprising: means for intercepting a PATH message; means for sending an RESV+PATH message to a policy enforcement device as a response to said PATH message intercepted by said intercepting, said RESV+PATH message carrying path information and a resource reservation request for the communication from said first party to said second party, said policy enforcement device connecting to a network; means for receiving a message, said message being either an RESV_ERR message or an RESV_Confirm+RESV message, said message resulting from said sending of an RESV+PATH message; means for sending an RESV_Confirm message to a first party if said message is an RESV_Confirm_RESV message, said first party being the initiating party in said two-way communication and means for entering a two-way communication session after said sending of an RESV_Confirm message.

28. The method according to claims 6, 7, 15, or 16, wherein said reserving needed network resource includes: examining, by said policy enforcement device, admission control policies; checking, by said policy enforcement device, the availability of network resources; and generating said decision based on said admission control policies, said availability of network resources, and said needed network resource.

29. The system according to claims 18 or 23, further comprising: at least one resource reservation controller to reserve said needed network resource requested by said policy enforcement device, each of said at least one resource reservation controller generating a decision of either positive, representing granting the needed network resource, or negative, representing not granting the needed network resource.

* * * * *